US011892796B2

(12) United States Patent
Sato

(10) Patent No.: US 11,892,796 B2
(45) Date of Patent: Feb. 6, 2024

(54) IMAGE FORMING APPARATUS

(71) Applicant: BROTHER KOGYO KABUSHIKI KAISHA, Nagoya (JP)

(72) Inventor: Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/054,178

(22) Filed: Nov. 10, 2022

(65) Prior Publication Data

US 2023/0205126 A1 Jun. 29, 2023

(30) Foreign Application Priority Data

Dec. 23, 2021 (JP) ................................ 2021-210003

(51) Int. Cl.
*G03G 21/10* (2006.01)
*G03G 15/08* (2006.01)

(52) U.S. Cl.
CPC ....... *G03G 21/105* (2013.01); *G03G 15/0887* (2013.01); *G03G 2221/1621* (2013.01)

(58) Field of Classification Search
CPC ............. G03G 21/105; G03G 15/0887; G03G 2221/1621; G03G 15/0865; G03G 15/0877

See application file for complete search history.

(56) References Cited

U.S. PATENT DOCUMENTS

| | | | | |
|---|---|---|---|---|
| 6,226,490 | B1 * | 5/2001 | Fujita .................. | G03G 21/105 399/359 |
| 2011/0103845 | A1 | 5/2011 | Sato | |
| 2017/0176887 | A1 * | 6/2017 | Bejat .................. | G03G 15/0865 |
| 2018/0267459 | A1 | 9/2018 | Sato et al. | |

FOREIGN PATENT DOCUMENTS

| | | | |
|---|---|---|---|
| JP | 5-249828 | A | 9/1993 |
| JP | 2011-95472 | A | 5/2011 |
| JP | 2018-155959 | A | 10/2018 |

* cited by examiner

*Primary Examiner* — Sandra Brase
(74) *Attorney, Agent, or Firm* — Merchant & Gould P.C.

(57) ABSTRACT

A drum cleaner cleans a circumferential surface of a photosensitive drum. A toner pipe allows passage of toner that is recovered from the drum cleaner to a toner container. The toner pipe has a discharge port configured to discharge toner in the toner pipe. The toner container includes a toner discharge port, a toner reception port, and a toner conveyor. The toner discharge port discharges toner in the toner container. The toner reception port receives toner discharged from the discharge port of the toner pipe. The toner conveyor conveys toner from the toner reception port toward the toner discharge port. A development housing includes a development reception port and a development discharge port. The development reception port receives toner discharged from the toner discharge port. The development discharge port discharges, to the toner pipe, toner that is retuned from the development housing to the toner container.

20 Claims, 15 Drawing Sheets

6Y

6Y

IMAGE FORMING APPARATUS

REFERENCE TO RELATED APPLICATIONS

This application claims priority from Japanese Patent Application No. 2021-210003 filed on Dec. 23, 2021. The entire content of the priority application is incorporated herein by reference.

BACKGROUND ART

Conventionally, an image forming apparatus includes a drum cartridge and a toner cartridge.

DESCRIPTION

A drum cartridge includes a photosensitive drum, a development device, a cleaner, and a conveyance pipe. The toner cartridge includes a waste toner container and a toner container. The cleaner removes toner from a circumferential surface of the photosensitive drum. The conveyance pipe conveys the toner removed by the cleaner. The waste toner container stores toner conveyed through the conveyance pipe. The toner container stores toner to be supplied to the photosensitive drum.

In an image forming apparatus, there are cases where it is desired to increase the capacity of a toner container while suppressing an increase in the size of a toner cartridge.

In view of the foregoing, an example of an object of this disclosure is to provide an image forming apparatus configured to increase the capacity of a toner container while suppressing an increase in the size of the toner container.

According to one aspect, this specification discloses an image forming apparatus. The image forming apparatus includes a photosensitive drum, a toner container, a development housing, a development roller, a drum cleaner, and a toner pipe. The photosensitive drum is rotatable about a first axis extending in a first direction. The toner container is configured to contain toner. The development housing is configured to contain toner from the toner container. The development roller is rotatably supported by the development housing. The development roller is configured to supply toner in the development housing to the photosensitive drum. The drum cleaner is configured to clean a circumferential surface of the photosensitive drum. The toner pipe is configured to allow passage of toner that is recovered from the drum cleaner to the toner container. The toner pipe has a discharge port configured to discharge toner in the toner pipe. The toner container includes a toner discharge port, a toner reception port, and a toner conveyor. The toner discharge port is configured to discharge toner in the toner container. The toner reception port is configured to receive toner discharged from the discharge port of the toner pipe. The toner conveyor is configured to convey toner from the toner reception port toward the toner discharge port. The development housing includes a development reception port and a development discharge port. The development reception port is configured to receive toner discharged from the toner discharge port. The development discharge port is configured to discharge, to the toner pipe, toner that is retuned from the development housing to the toner container.

According to another aspect, this specification also discloses an image forming apparatus. The image forming apparatus includes a first photosensitive drum, a second photosensitive drum, a first toner container, a first development housing, a first development roller, a second toner container, a second development housing, a second development roller, a drum cleaner, and a toner pipe. The first photosensitive drum is rotatable about a first axis extending in a first direction. The second photosensitive drum is rotatable about a second axis extending in the first direction. The second photosensitive drum is aligned with the first photosensitive drum in a second direction crossing the first direction. The first toner container is configured to contain toner. The first development housing is configured to contain toner from the first toner container. The first development roller is rotatably supported by the first development housing. The first development roller is configured to supply toner in the first development housing to the first photosensitive drum. The second toner container is configured to contain toner. The second toner container is aligned with the first toner container in the second direction. The second development housing is configured to contain toner from the second toner container. The second development housing is aligned with the first development housing in the second direction. The second development roller is rotatably supported by the second development housing. The second development roller is configured to supply toner in the second development housing to the second photosensitive drum. The drum cleaner is configured to clean a circumferential surface of the first photosensitive drum. The toner pipe is configured to allow passage of toner that is recovered from the drum cleaner to the first toner container. The toner pipe has a discharge port configured to discharge toner in the toner pipe. The first toner container includes a toner discharge port, a toner reception port, and a toner conveyor. The toner discharge port is configured to discharge toner in the first toner container. The toner reception port is configured to receive toner discharged from the discharge port of the toner pipe. The toner conveyor is configured to convey toner from the toner reception port toward the toner discharge port. The first development housing includes a development reception port and a development discharge port. The development reception port is configured to receive toner discharged from the toner discharge port. The development discharge port is configured to discharge, to the toner pipe, toner that is retuned from the first development housing to the first toner container.

With this configuration, the recovered toner is returned to the toner container through the toner pipe. Thus, the recovered toner is mixed with the unused toner in the toner container and supplied to the photosensitive drum again. Thus, it is not necessary to provide a portion for containing the recovered toner at the toner container, and the capacity of the toner container is increased accordingly. As a result, the capacity of the toner container is increased while suppressing an increase in the size of the toner container. Further, the toner in the development housing is also returned to the toner container through the toner pipe. Thus, the toner is circulated between the development housing and the toner container to suppress the toner remaining in the development housing. This suppresses the toner remaining in the development housing being repeatedly charged and deteriorated in the development housing. Further, by returning the recovered toner and the returned toner from the development housing to the toner container through the toner pipe, the recovered toner and the returned toner from the development housing are mixed in the toner pipe.

1. OUTLINE OF IMAGE FORMING APPARATUS 1

An outline of an image forming apparatus 1 will be described with reference to FIGS. 1 to 5. In the following description, a "vertical direction" (upper-lower direction) means the vertical direction in a state where the image forming apparatus 1 is placed on a horizontal plane.

Figure 1:
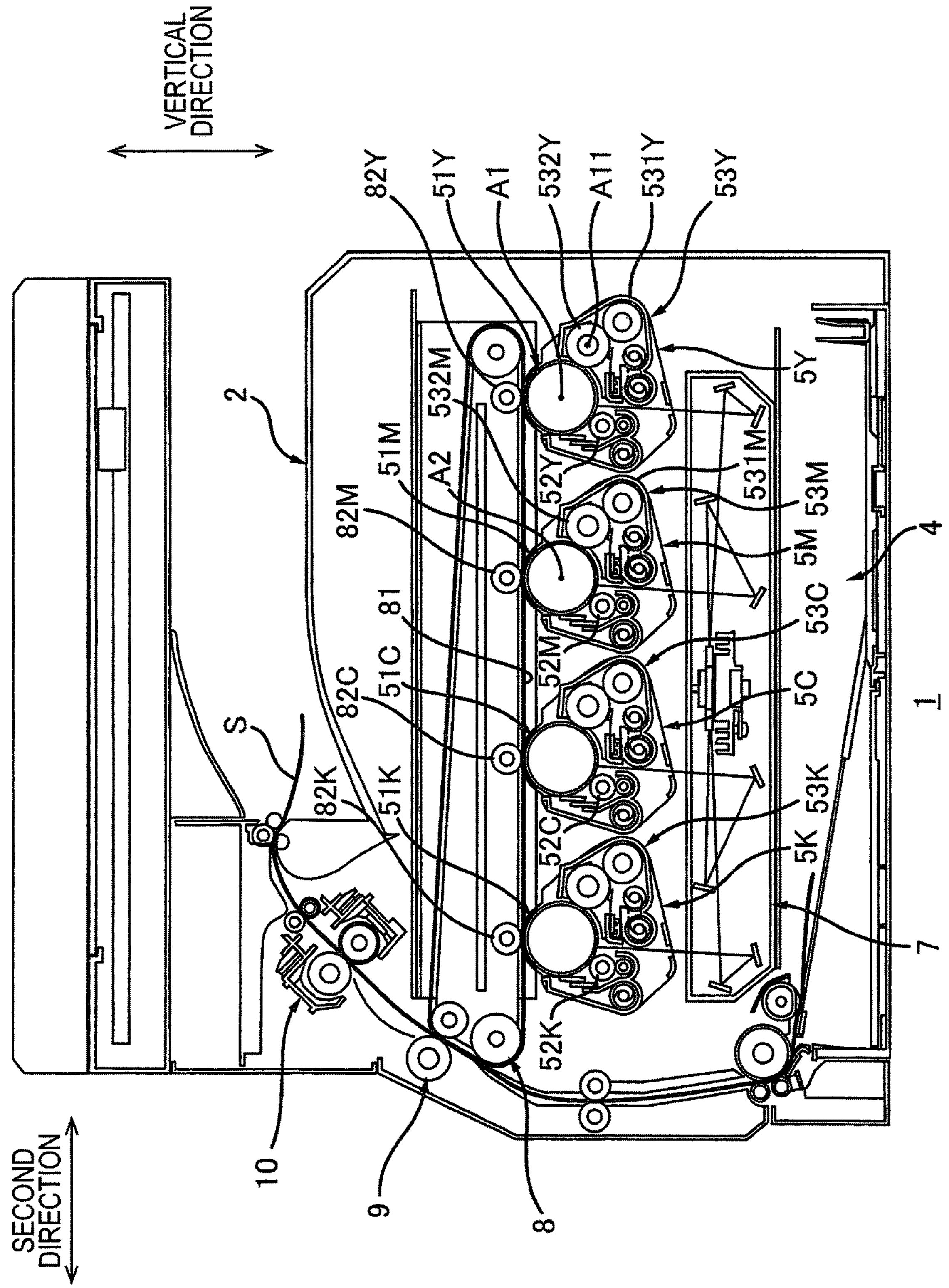
FIG. 1 is a diagram showing a schematic configuration of an image forming apparatus.
Figure 2:
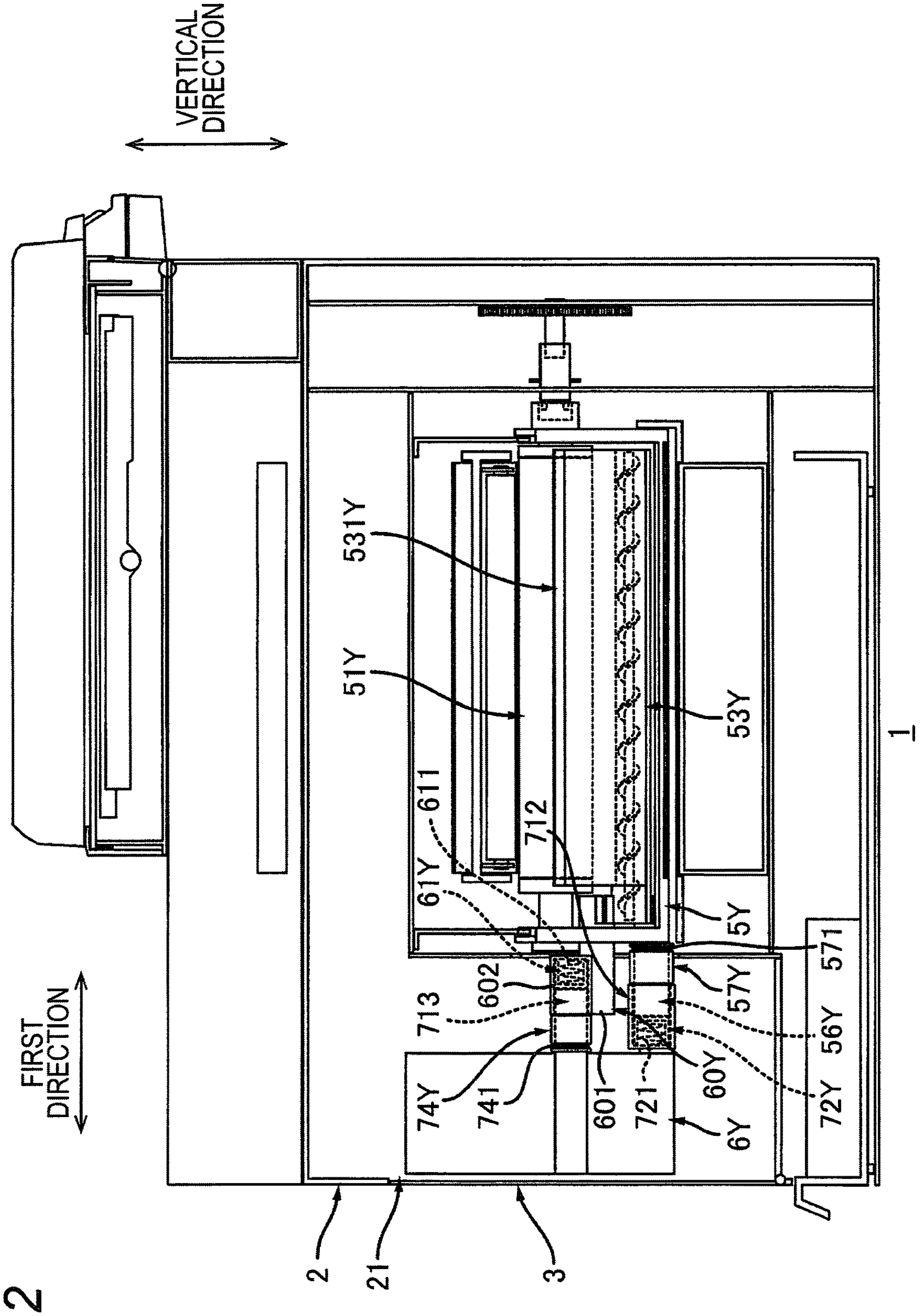
FIG. 2 is a cross-sectional view of the image forming apparatus shown in FIG. 1.
Figure 3:
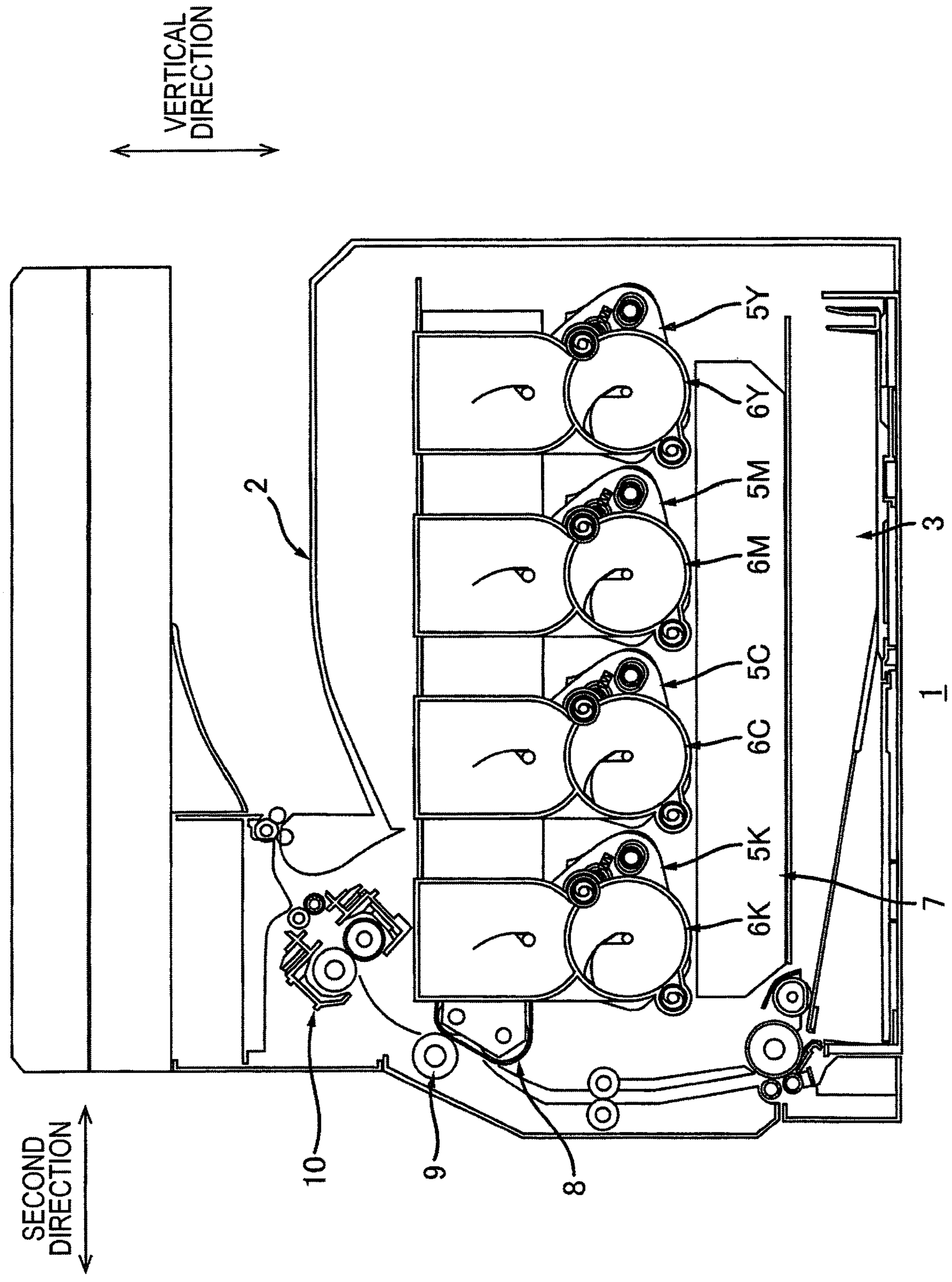
FIG. 3 is a cross-sectional view of the image forming apparatus shown in FIG. 2, taken through toner containers.

As shown in FIGS. 1 to 3, the image forming apparatus 1 includes a main housing 2, a cover 3 (see FIG. 2), a sheet accommodating section 4, a plurality of drum cartridges 5Y, 5M, 5C, and 5K, a plurality of toner containers 6Y, 6M, 6C, and 6K (see FIG. 3), an exposure device 7, an intermediate transfer unit 8, a transfer roller 9, and a fixing device (fuser) 10.

1.1 Main Housing 2

The main housing 2 accommodates the sheet accommodating section 4, the drum cartridges 5Y, 5M, 5C, and 5K, the toner containers 6Y, 6M, 6C, and 6K (see FIG. 3), the exposure device 7, the intermediate transfer unit 8, the transfer roller 9, and the fixing device 10.

As shown in FIG. 2, the main housing 2 has an opening 21. The opening 21 is located at one end of the main housing 2 in a first direction.

1.2 Cover 3

Figure 4:
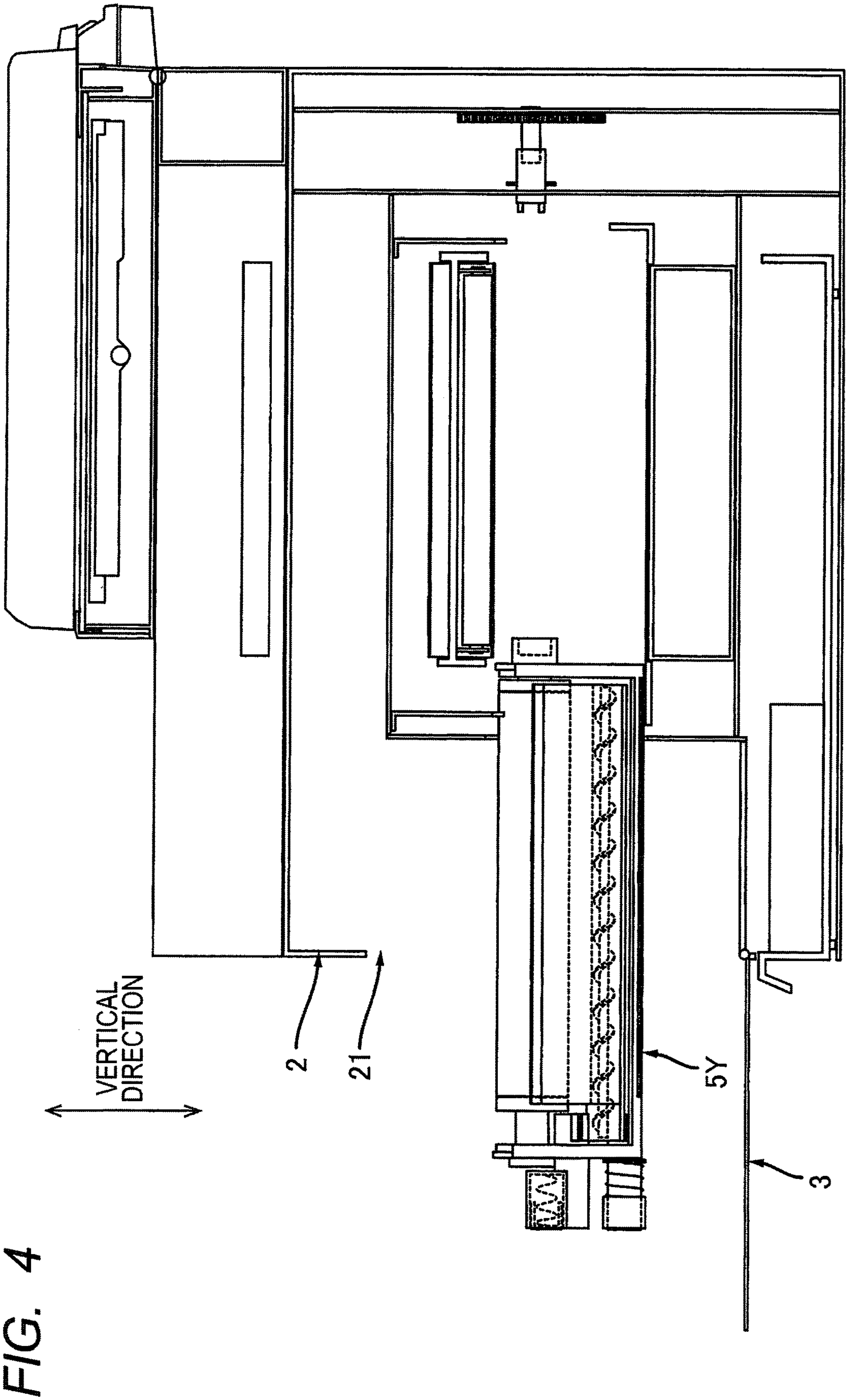
FIG. 4 is an explanatory diagram explaining attachment and detachment of a drum cartridge shown in FIG. 2.

As shown in FIGS. 2 and 4, the cover 3 is movable between a cover closed position (see FIG. 2) and a cover open position (see FIG. 4). As shown in FIG. 2, the cover 3 closes the opening 21 in a state where the cover 3 is located at the cover closed position. As shown in FIG. 4, the cover 3 opens the opening 21 in a state where the cover 3 is located at the cover open position.

1.3 Sheet Accommodating Section 4

As shown in FIG. 1, the sheet accommodating section 4 accommodates a sheet S. The sheet S in the sheet accommodating section 4 is conveyed toward the transfer roller 9.

1.4 Drum Cartridge 5Y

The drum cartridge 5Y is attachable to and detachable from the main housing 2. Specifically, as shown in FIG. 4, the drum cartridge 5Y is attached to and detached from the main housing 2 through the opening 21 in the first direction in a state where the cover 3 is located at the cover open position.

As shown in FIG. 1, the drum cartridge 5Y includes a photosensitive drum 51Y, a charging roller 52Y, and a development unit 53Y. In other words, the image forming apparatus 1 includes the photosensitive drum 51Y and the development unit 53Y.

1.4.1 Photosensitive Drum 51Y

The photosensitive drum 51Y has a cylindrical shape. The photosensitive drum 51Y extends in the first direction in a state where the drum cartridge 5Y is mounted in the main housing 2. The photosensitive drum 51Y is rotatable about a first axis A1. The first axis A1 extends in the first direction in a state where the drum cartridge 5Y is mounted in the main housing 2.

1.4.2 Charging Roller 52Y

The charging roller 52Y charges the photosensitive drum 51Y. The drum cartridge 5Y may have a scorotron charger instead of the charging roller 52Y.

1.4.3 Development Unit 53Y

The development unit 53Y supplies toner in a toner container 6Y (see FIG. 2) to the photosensitive drum 51Y. The development unit 53Y has a development housing 531Y and a development roller 532Y.

The development housing 531Y accommodates toner from the toner container 6Y.

The development roller 532Y supplies the toner in the development housing 531Y to the photosensitive drum 51Y. The development roller 532Y is rotatably supported by the development housing 531Y. The development roller 532Y contacts the photosensitive drum 51Y. The development roller 532Y may be separable from the photosensitive drum 51Y. The development roller 532Y extends in the first direction in a state when the drum cartridge 5Y is mounted in the main housing 2. The development roller 532Y is rotatable about a development axis A11. The development axis A11 extends in the first direction in a state when the drum cartridge 5Y is mounted in the main housing 2.

1.5 Drum Cartridges 5M, 5C, 5K

Each of the drum cartridges 5M, 5C, 5K has the same structure as the drum cartridge 5Y.

That is, the drum cartridge 5M includes a photosensitive drum 51M and a development unit 53M. In other words, the image forming apparatus 1 includes the photosensitive drum 51M and the development unit 53M. The photosensitive drum 51M is rotatable about a second axis A2. The second axis A2 extends in the first direction in a state where the drum cartridge 5M is mounted in the main housing 2. In a state where the drum cartridge 5Y and the drum cartridge 5M are mounted in the main housing 2, the photosensitive drum 51M is aligned with the photosensitive drum 51Y in a second direction. The second direction crosses the first direction. The development unit 53M supplies the toner in the toner container 6M (see FIG. 3) to the photosensitive drum 51M. The development unit 53M has a development housing 531M and a development roller 532M. The development housing 531M accommodates toner from the toner container 6M. The development roller 532M is rotatably supported by the development housing 531M. In a state where the drum cartridge 5Y and the drum cartridge 5M are mounted in the main housing 2, the development unit 53M is aligned with the development unit 53Y in the second direction.

A description of each of the drum cartridges 5C and 5K is omitted.

1.6 Toner Containers 6Y, 6M, 6C, 6K

Figure 5:
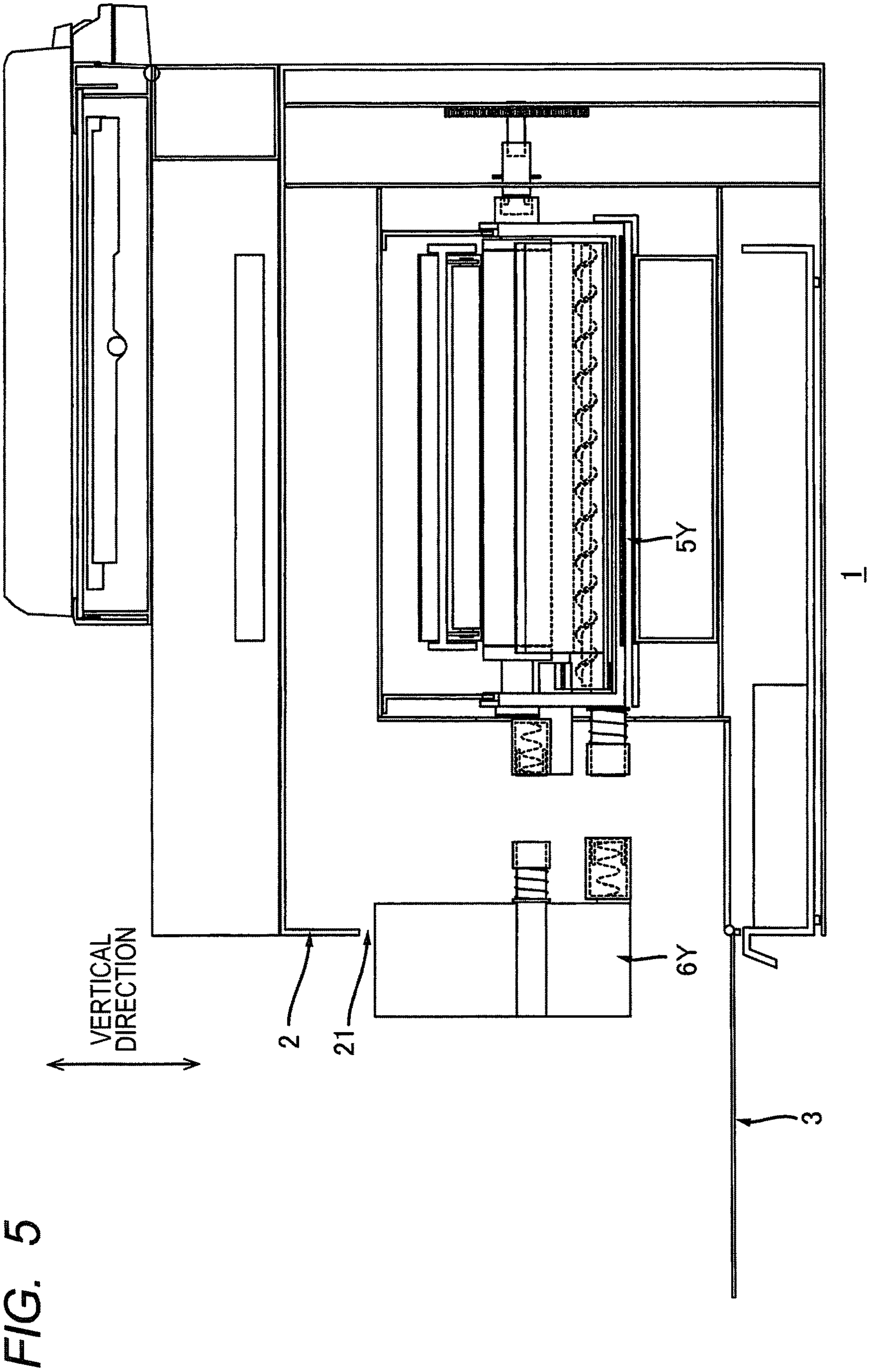
FIG. 5 is an explanatory diagram for explaining attachment and detachment of a toner container shown in FIG. 2.

As shown in FIG. 5, the toner container 6Y is attachable to and detachable from the drum cartridge 5Y. Specifically, in a state where the cover 3 is located at the cover open position and the drum cartridge 5Y is mounted in the main housing 2, the toner container 6Y is attachable to and detachable from the drum cartridge 5Y through the opening 21 in the first direction. The toner container 6Y contains toner. The image forming apparatus 1 may prompt the user to replace the toner container 6Y in a state where a particular amount of toner remains in the toner container 6Y As shown in FIG. 2, in a state where the toner container 6Y is attached to the drum cartridge 5Y, the toner container 6Y is aligned with the development unit 53Y in the first direction.

As shown in FIG. 3, each of the toner containers 6M, 6C, and 6K has the same structure as the toner container 6Y. In a state where the toner container 6Y is attached to the drum cartridge 5Y and the toner container 6M is attached to the drum cartridge 5M, the toner container 6M is aligned with the toner container 6Y in the second direction. A description of each of the toner containers 6M, 6C, and 6K is omitted.

1.7 Exposure Device 7

As shown in FIG. 1, in a state where the drum cartridges 5Y, 5M, 5C, and 5K are mounted in the main housing 2, the exposure device 7 exposes the circumferential surface of the photosensitive drum 51Y charged by the charging roller 52Y, the circumferential surface of the photosensitive drum 51M charged by the charging roller 52M, the circumferential surface of a photosensitive drum 51C charged by a charging roller 52C, and the circumferential surface of a photosensitive drum 51K charged by a charging roller 52K. In this embodiment, the exposure device 7 is a laser scanning unit. The exposure device 7 may be an LED head.

The development unit 53Y supplies toner to the exposed circumferential surface of the photosensitive drum 51Y. The development unit 53M supplies toner to the exposed circumferential surface of the photosensitive drum 51M. A development unit 53C supplies toner to the exposed circumferential surface of the photosensitive drum 51C. A development unit 53K supplies toner to the exposed circumferential surface of the photosensitive drum 51K.

1.8 Intermediate Transfer Unit 8

In a state where the drum cartridges 5Y, 5M, 5C, and 5K are mounted in the main housing 2, the intermediate transfer unit 8 is located above the drum cartridges 5Y, 5M, 5C, and 5K. The intermediate transfer unit 8 includes an intermediate transfer belt 81 and transfer rollers 82Y, 82M, 82C and 82K.

In a state where the drum cartridges 5Y, 5M, 5C and 5K are mounted in the image forming apparatus 1, the intermediate transfer belt 81 contacts the photosensitive drums 51Y, 51M, 51C and 51K.

The transfer roller 82 Y transfers the toner on the photosensitive drum 51 Y to the intermediate transfer belt 81. The transfer roller 82M transfers the toner on the photosensitive drum 51M to the intermediate transfer belt 81. The transfer roller 82C transfers the toner on the photosensitive drum 51C to the intermediate transfer belt 81. The transfer roller 82K transfers the toner on the photosensitive drum 51K to the intermediate transfer belt 81.

1.9 Transfer Roller 9

The transfer roller 9 transfers the toner on the intermediate transfer belt 81 to the sheet S. Specifically, the sheet S conveyed from the sheet accommodating section 4 toward the transfer roller 9 passes between the transfer roller 9 and the intermediate transfer belt 81 and is conveyed to the fixing device 10. At this time, the transfer roller 9 transfers the toner on the intermediate transfer belt 81 to the sheet S.

1.10 Fixing Device 10

The fixing device 10 heats and presses the sheet S on which toner has been transferred to fix the toner onto the sheet S. The sheet S that has passed through the fixing device 10 is discharged to the upper surface of the main housing 2.

2. DETAILS OF DRUM CARTRIDGE 5Y

In the present disclosure, in a state where the drum cartridge 5Y is mounted in the main housing 2 and the toner container 6Y is attached to the drum cartridge 5Y, the drum cartridge 5Y and the toner container 6Y recover, into the toner container 6Y, the toner remaining on the circumferential surface of the photosensitive drum 51Y without being transferred onto the sheet S. Hereinafter, the toner recovered from the photosensitive drum 51Y to the toner container 6Y is defined as recovered toner.

In a state where the drum cartridge 5Y is mounted in the main housing 2 and the toner container 6Y is attached to the drum cartridge 5Y, the drum cartridge 5Y and the toner container 6Y circulate toner between the development housing 531Y and the toner container 6Y. Thus, the development unit 53Y again supplies the recovered toner mixed with unused toner in the toner container 6Y to the photosensitive drum 51Y. The unused toner is toner that has never been supplied from the toner container 6Y to the development unit 53Y or the photosensitive drum 51Y. In the following description, the toner returned from the development housing 531Y to the toner container 6Y is defined as returned toner.

Details of the drum cartridge 5Y will be described below with reference to FIGS. 6 to 10. In the following description of the drum cartridge 5Y, "first direction" and "vertical direction" refer to the first direction and the vertical direction in a state where the drum cartridge 5Y is mounted in the main housing 2.

Figure 6:
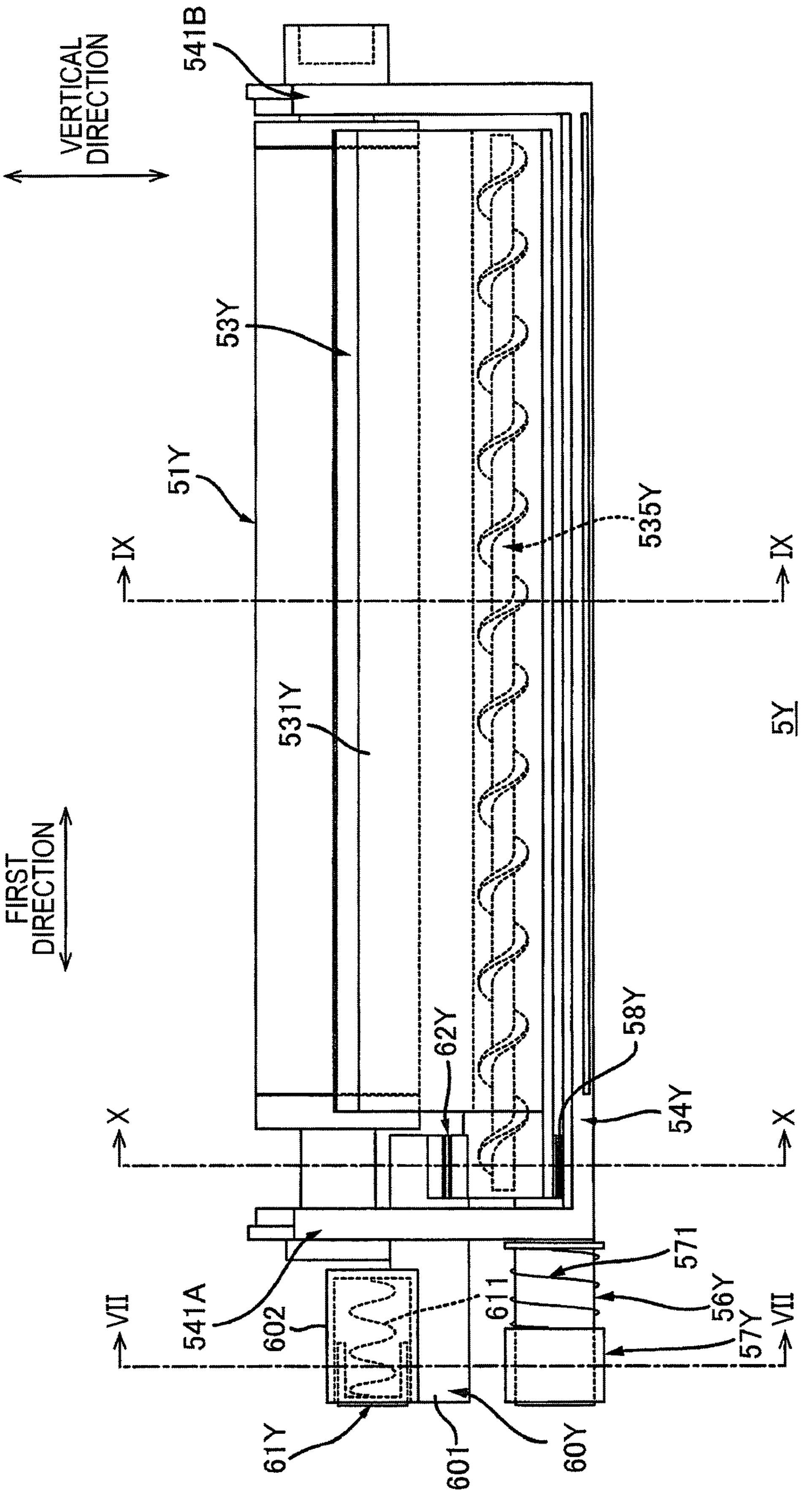
FIG. 6 is an enlarged view of the drum cartridge shown in FIG. 2.

As shown in FIG. 6, the drum cartridge 5Y includes a drum frame 54Y, a drum cleaner 55Y (see FIG. 9), a toner pipe 56Y, a toner pipe shutter 57Y, a first seal member 58Y (see FIG. 10), a toner pipe conveyor 59Y (see FIG. 10), a connection pipe 60Y, a connection pipe shutter 61Y, a second seal member 62Y (see FIG. 10), and a connection pipe conveyor 63Y (see FIG. 10), in addition to the photosensitive drum 51Y, the charging roller 52Y and the development unit 53Y. That is, the image forming apparatus 1 includes the drum cleaner 55Y, the toner pipe 56Y, the toner pipe shutter 57Y, the first seal member 58Y, the connection pipe 60Y, the connection pipe shutter 61Y, and the second seal member 62Y.

2.1 Drum Frame 54Y

As shown in FIG. 6, the drum frame 54Y extends in the first direction. The drum frame 54Y has side plates 541A and 541B. That is, the image forming apparatus 1 has the side plate 541A.

Figure 7:
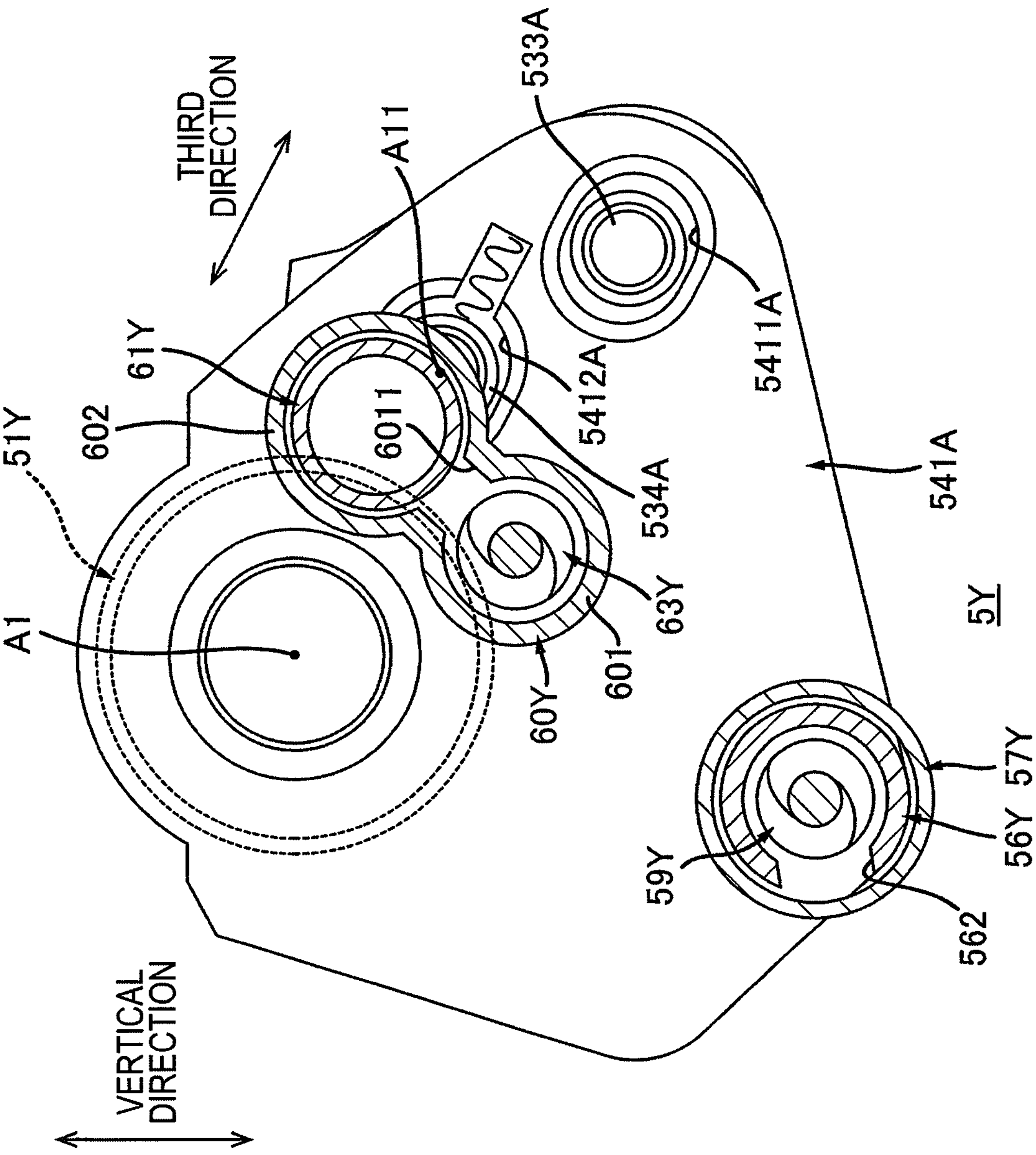
FIG. 7 is a cross-sectional view of the drum cartridge shown in FIG. 6 taken along a line VII-VII.

The side plate 541A is located at one end of the drum frame 54Y in the first direction. The side plate 541A is located with a space in the first direction from one end of the development housing 531Y in the first direction. The side plate 541A extends in a direction crossing the first direction. The side plate 541A extends in a direction perpendicular to the first direction, for example. The side plate 541A supports one end of the photosensitive drum 51Y in the first direction. As shown in FIG. 7, the side plate 541A has two holes 5411A and 5412A.

The hole 5411A is located away from the photosensitive drum 51Y in a third direction. The third direction is the direction connecting the first axis A1 and the development axis A11. The hole 5411A extends in the third direction. The hole 5411A is an elongated hole.

The hole 5412A is located between the hole 5411A and the photosensitive drum 51Y in the third direction. The hole 5412A extends in the third direction. The hole 5412A is an elongated hole.

Figure 8:
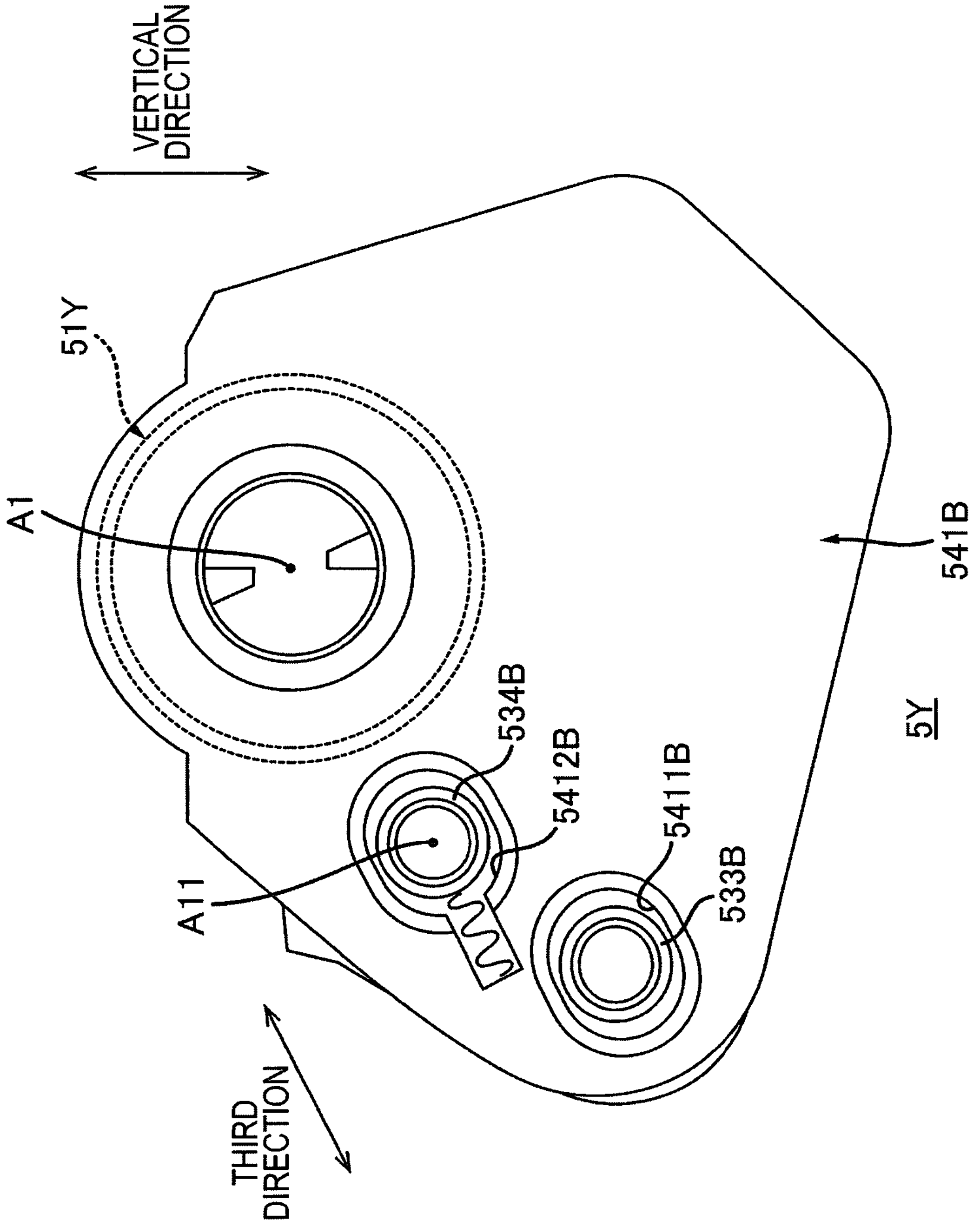
FIG. 8 is a side view of the drum cartridge shown in FIG. 6, viewed from one side in a first direction.

As shown in FIG. 6, the side plate 541B is located at the other end of the drum frame 54Y in the first direction. The side plate 541B is located with a space in the first direction from the other end of the development housing 531Y in the first direction. The side plate 541B extends in a direction crossing the first direction. The side plate 541B extends in a direction perpendicular to the first direction, for example. The side plate 541B supports the other end of the photosensitive drum 51Y in the first direction. As shown in FIG. 8, the side plate 541B has two holes 5411B and 5412B.

The hole 5411B is located away from the photosensitive drum 51Y in the third direction. The hole 5411B extends in the third direction. The hole 5411B is an elongated hole.

The hole 5412B is located between the hole 5411B and the photosensitive drum 51Y in the third direction. The hole 5412B extends in the third direction. The hole 5412B is an elongated hole.

2.2 Details of Development Unit 53Y

Figure 9:
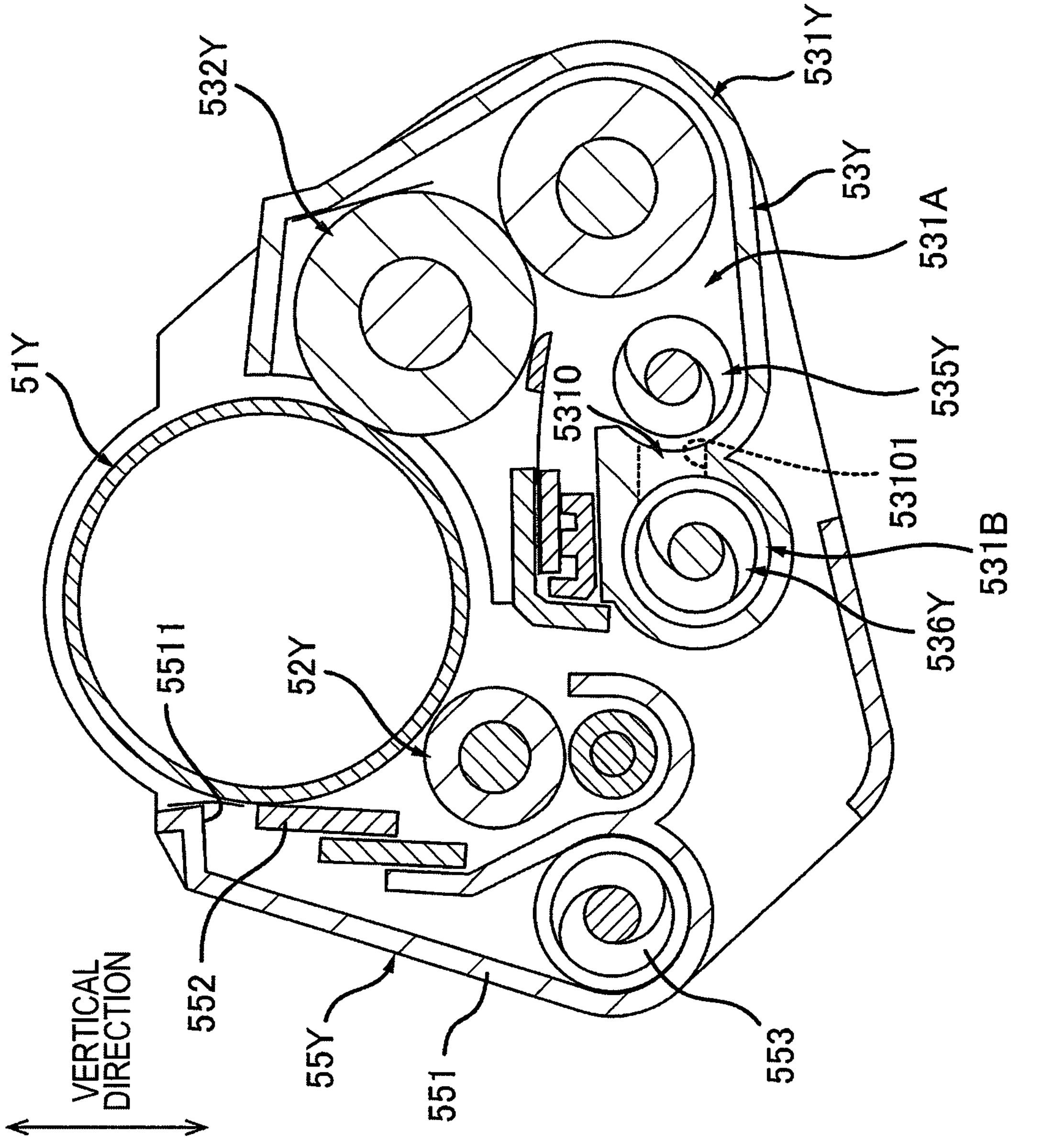
FIG. 9 is a cross-sectional view of the drum cartridge shown in FIG. 6, taken along a line IX-IX.

As shown in FIG. 9, the development unit 53Y includes two protrusions 533A and 534A (see FIG. 7), two protrusions 533B and 534B (see FIG. 8), a first development conveyor 535Y, and a second development conveyor 536Y as a development conveyor, in addition to the development housing 531Y and the development roller 532Y described above.

2.2.2 Details of Development Housing 531Y

As shown in FIG. 6, the development housing 531Y extends in the first direction. The development housing 531Y has a partition wall 5310 (see FIG. 9), a development reception portion 5311 (see FIG. 10), and a development discharge portion 5312 (see FIG. 10).

As shown in FIG. 9, the partition wall 5310 partitions the internal space of the development housing 531Y into a first internal space 531A and a second internal space 531B. The first internal space 531A accommodates a part of the development roller 532Y. The partition wall 5310 has a passage 53101. The passage 53101 allows communication between the first internal space 531A and the second internal space 531B. The passage 53101 is located at the other end of the partition wall 5310 in the first direction.

Figure 10:
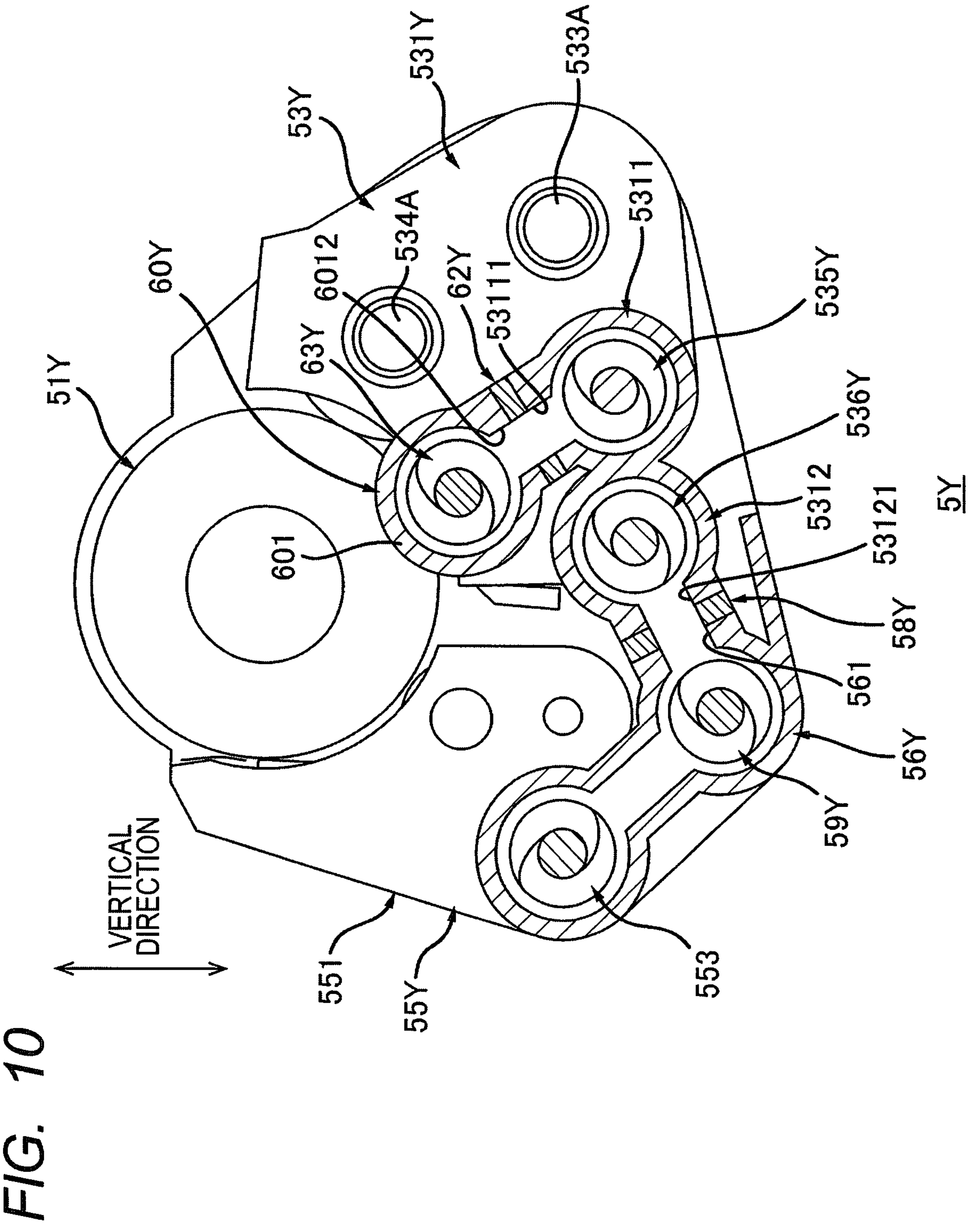
FIG. 10 is a cross-sectional view of the drum cartridge shown in FIG. 6, taken along a line X-X.

As shown in FIG. 10, the development reception portion 5311 is located at one end of the development housing 531Y in the first direction. The development reception portion 5311 extends in the first direction. The development reception portion 5311 has a cylindrical shape. The internal space of the development reception portion 5311 communicates with the first internal space 531A (see FIG. 9). The development reception portion 5311 has a development reception port 53111. That is, the development housing 531Y has the development reception port 53111.

Figure 14:
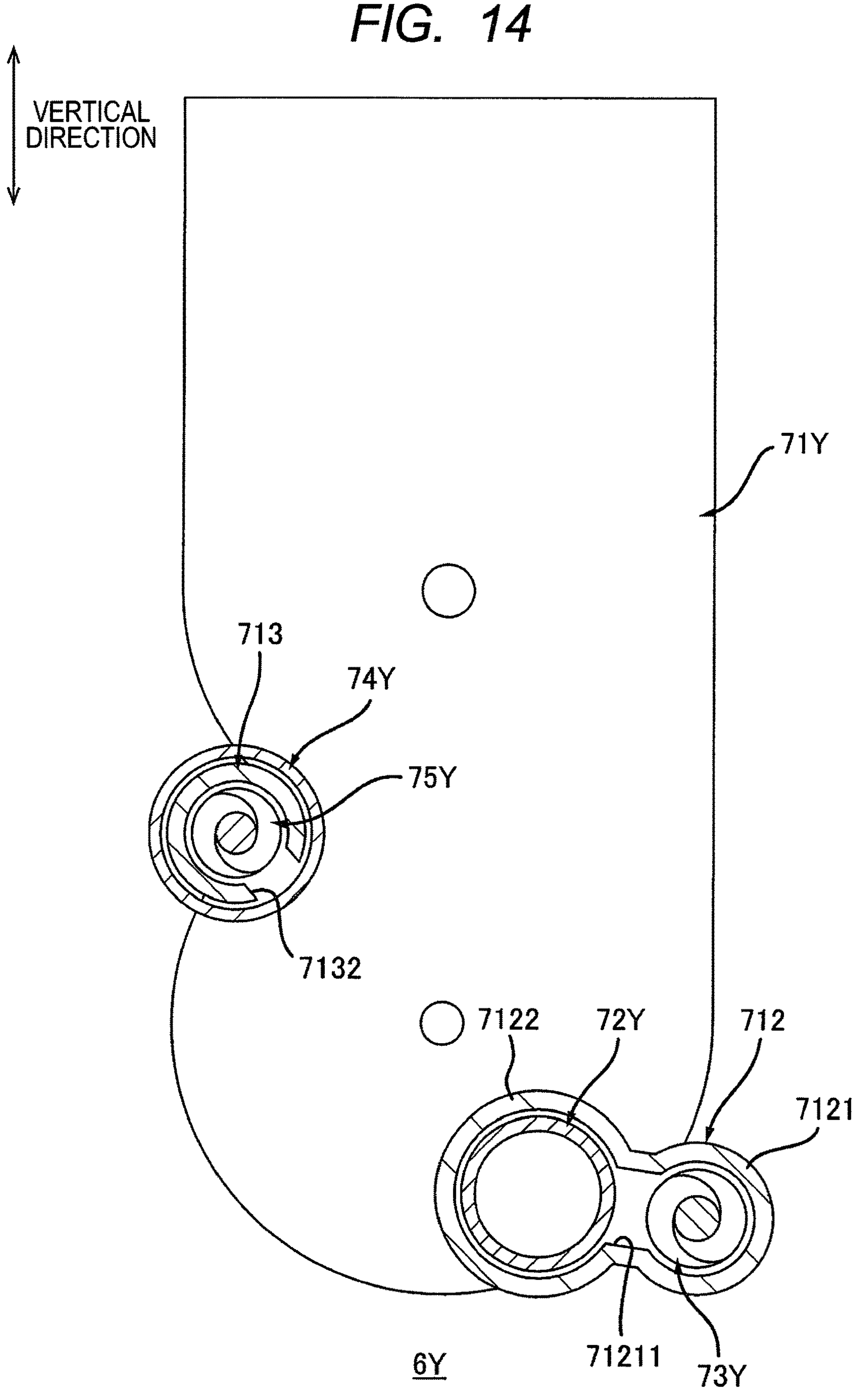
FIG. 14 is a cross-sectional view of the toner container shown in FIG. 11, taken along a line XIV-XIV.

In a state where the drum cartridge 5Y is mounted in the main housing 2 and the toner container 6Y is attached to the drum cartridge 5Y, the development reception port 53111 receives toner discharged from a toner discharge port 7132 of the toner container 6Y (see FIG. 14). Specifically, in a state where the drum cartridge 5Y is mounted in the main housing 2 and the toner container 6Y is attached to the drum cartridge 5Y, the development reception port 53111 receives, through a connection pipe discharge port 6012, toner discharged from the toner discharge port 7132 and having passed through the connection pipe 60Y. The toner discharge port 7132 and the connection pipe discharge port 6012 will be described later. The development reception port 53111 communicates with the internal space of the development reception portion 5311.

The development discharge portion 5312 is located at one end of the development housing 531Y in the first direction. The development discharge portion 5312 extends in the first direction. The development discharge portion 5312 has a cylindrical shape. The internal space of the development discharge portion 5312 communicates with the second internal space 531B (see FIG. 9). The development discharge portion 5312 has a development discharge port 53121. In other words, the development housing 531Y has the development discharge port 53121.

The development discharge port 53121 discharges the returned toner to the toner pipe 56Y. Thus, the recovered toner from the drum cleaner 55Y is mixed with the returned toner from the development housing 531Y in the toner pipe 56Y. The development discharge port 53121 communicates with the internal space of the development discharge portion 5312.

2.2.3 Protrusions 533A, 534A, 533B, 534B

As shown in FIG. 7, the protrusion 533A fits into the hole 5411A of the side plate 541A. The protrusion 533A extends from one outer surface of the development housing 531Y in the first direction. The protrusion 533A extends in the first direction. The protrusion 533A has a cylindrical shape.

The protrusion 534A fits into the hole 5412A of the side plate 541A. The protrusion 534A extends from one outer surface of the development housing 531Y in the first direction. The protrusion 534A is located away from the protrusion 533A. The protrusion 534A extends in the first direction. In this embodiment, the protrusion 534A extends along the development axis A11. The protrusion 534A may be one end of a development roller shaft in the first direction. The protrusion 534A has a cylindrical shape.

As shown in FIG. 8, the protrusion 533B fits into the hole 5411B of the side plate 541B. The protrusion 533B extends from the other outer surface of the development housing 531Y in the first direction. The protrusion 533B extends in the first direction. The protrusion 533B has a cylindrical shape.

The protrusion 534B fits into the hole 5412B of the side plate 541B. The protrusion 534B extends from the other outer surface of the development housing 531Y in the first direction. The protrusion 534B is located away from the protrusion 533B. The protrusion 534B extends in the first direction. In this embodiment, the protrusion 534B extends along the development axis A11. The protrusion 534B may be the other end of the development roller shaft in the first direction. The protrusion 534B has a cylindrical shape.

In a state where the protrusion 533A fits into the hole 5411A, the protrusion 534A fits into the hole 5412A, the protrusion 533B fits into the hole 5411B, and the protrusion 534B fits into the hole 5412B, the development unit 53Y is movable in the third direction relative to the photosensitive drum 51Y.

2.2.4 First Development Conveyor 535Y

As shown in FIG. 9, the first development conveyor 535Y is located within the first internal space 531A of the development housing 531Y. The first development conveyor 535Y conveys toner from the development reception port 53111 (see FIG. 10) toward the passage 53101. The first development conveyor 535Y extends in the first direction. In this embodiment, the first development conveyor 535Y is an auger screw.

2.2.5 Second Development Conveyor 536Y

The second development conveyor 536Y is located within the second internal space 531B of the development housing 531Y. The second development conveyor 536Y conveys toner from the passage 53101 toward the development discharge port 53121 (see FIG. 10). That is, the second development conveyor 536Y conveys the toner in the development housing 531Y toward the development discharge port 53121. The second development conveyor 536Y extends in the first direction. In this embodiment, the second development conveyor 536Y is an auger screw.

2.3 Drum Cleaner 55Y

The drum cleaner 55Y cleans the circumferential surface of the photosensitive drum 51Y. The drum cleaner 55Y removes, from the circumferential surface of the photosensitive drum 51Y, toner remaining on the circumferential surface of the photosensitive drum 51Y without being transferred from the photosensitive drum 51Y to the sheet S. The toner removed from the circumferential surface of the photosensitive drum 51Y by the drum cleaner 55Y becomes recovered toner.

The drum cleaner 55Y has a cleaner housing 551, a cleaning member 552, and a recovered toner conveyor 553.

The cleaner housing 551 is located between the side plate 541A (see FIG. 6) and the side plate 541B (see FIG. 6) in the first direction. The cleaner housing 551 extends in the first direction. One end of the cleaner housing 551 in the first direction is connected to the side plate 541A. The other end of cleaner housing 551 in the first direction is connected to the side plate 541B. The cleaner housing 551 has an opening 5511. The cleaner housing 551 accommodates recovered toner.

The cleaning member 552 is attached to the cleaner housing 551. The cleaning member 552 extends in the first direction. The cleaning member 552 has a plate shape. The cleaning member 552 cleans the circumferential surface of the photosensitive drum 51Y. Specifically, an edge of the cleaning member 552 contacts the circumferential surface of the photosensitive drum 51Y. When the photosensitive drum 51Y rotates, the toner on the circumferential surface of the photosensitive drum 51Y contacts the edge of the cleaning member 552 and is removed from the circumferential surface of the photosensitive drum 51Y. The removed toner is accommodated in the cleaner housing 551 through the opening 5511.

The recovered toner conveyor 553 is located inside the cleaner housing 551. The recovered toner conveyor 553 conveys the toner in the cleaner housing 551 in the first direction toward the toner pipe 56Y. In this embodiment, the recovered toner conveyor 553 is an auger screw.

2.4 Toner Pipe 56Y

As shown in FIG. 6, the toner pipe 56Y extends in the first direction. The toner pipe 56Y penetrates the side plate 541A in the first direction. One end of the toner pipe 56Y in the first direction is located at the opposite side of the development housing 531Y with respect to the side plate 541A. The other end of the toner pipe 56Y in the first direction is located between the development housing 531Y and the side plate 541A.

As shown in FIG. 10, the other end of the toner pipe 56Y in the first direction is connected to one end of the cleaner housing 551 in the first direction. The toner pipe 56Y communicates with the cleaner housing 551. Thus, the toner pipe 56Y receives the recovered toner from the drum cleaner 55Y. The toner pipe 56Y allows passage of recovered toner recovered from the drum cleaner 55Y to the toner container 6Y In a state where the drum cartridge 5Y is mounted in the main housing 2, the toner pipe 56Y is located at a lower position than the drum cleaner 55Y. In a state where the drum cartridge 5Y is mounted in the main housing 2, the toner pipe 56Y is located at a lower position than the recovered toner conveyor 553. In a state where the drum cartridge 5Y is mounted in the main housing 2, the toner pipe 56Y is located at a lower position than the development reception port 53111. The toner pipe 56Y has a returned toner reception port 561 and a discharge port 562 (see FIG. 7).

The returned toner reception port 561 receives the returned toner discharged from the development discharge port 53121. The returned toner reception port 561 is located at the other end of the toner pipe 56Y in the first direction. The returned toner reception port 561 communicates with the internal space of the toner pipe 56Y.

As shown in FIG. 7, the discharge port 562 is located at one end of the toner pipe 56Y in the first direction. The discharge port 562 communicates with the internal space of the toner pipe 56Y. The discharge port 562 discharges the toner inside the toner pipe 56Y.

2.5 Toner Pipe Shutter 57Y

As shown in FIG. 6, the toner pipe shutter 57Y is located at one end of the toner pipe 56Y in the first direction. The toner pipe shutter 57Y is located on the circumferential surface of the toner pipe 56Y. The toner pipe shutter 57Y opens and closes the discharge port 562 (see FIG. 7). Specifically, the toner pipe shutter 57Y is movable relative to the toner pipe 56Y between a closed position (see FIG. 6) and an open position (see FIG. 2). The toner pipe shutter 57Y (see FIG. 2) located at the open position is located closer to the side plate 541A in the first direction than the toner pipe shutter 57Y (see FIG. 6) located at the closed position is. The toner pipe shutter 57Y is movable in the first direction between the closed position and the open position. The toner pipe shutter 57Y closes the discharge port 562 in a state where the toner pipe shutter 57Y is at the closed position. The discharge port 562 is opened in a state where the toner pipe shutter 57Y is at the open position. The toner pipe shutter 57Y located at the open position is pressed toward the closed position by a spring 571.

2.6 First Seal Member 58Y

As shown in FIG. 10, the first seal member 58Y is located between the development discharge portion 5312 and the other end of the toner pipe 56Y in the first direction. The first seal member 58Y is located around the development discharge port 53121 and the returned toner reception port 561. The first seal member 58Y seals between the toner pipe 56Y and the development unit 53Y. Specifically, the first seal member 58Y seals the other end of the toner pipe 56Y in the first direction and the development discharge portion 5312. The first seal member 58Y is elastically deformable according to the movement of the development unit 53Y. The first seal member 58Y is made of sponge, for example.

As shown in FIG. 6, the first seal member 58Y is located between the side plate 541A and one end of the development housing 531Y in the first direction.

2.7 Toner Pipe Conveyor 59Y

As shown in FIGS. 7 and 10, the toner pipe conveyor 59Y is located inside the toner pipe 56Y. The toner pipe conveyor 59Y conveys the toner in the toner pipe 56Y in the first direction toward the discharge port 562. In this embodiment, the toner pipe conveyor 59Y is an auger screw.

2.8 Connection Pipe 60Y

As shown in FIG. 2, in a state where the drum cartridge 5Y is mounted in the main housing 2 and the toner container 6Y is attached to the drum cartridge 5Y, the connection pipe 60Y connects the toner container 6Y and the development housing 531Y. As shown in FIG. 6, the connection pipe 60Y includes a connection pipe main body 601 and an insertion portion 602.

2.8.1 Connection Pipe Main Body 601

The connection pipe main body 601 extends in the first direction. The connection pipe main body 601 has a cylindrical shape. The connection pipe main body 601 penetrates the side plate 541A in the first direction. The connection pipe main body 601 is supported by the side plate 541A. Thus, the connection pipe 60Y is supported by the side plate 541A. One end of the connection pipe main body 601 in the first direction is located at the opposite side of the development housing 531Y with respect to the side plate 541A. The other end of the connection pipe main body 601 in the first direction is located between the development housing 531Y and the side plate 541A. As shown in FIG. 10, in a state where the drum cartridge 5Y is mounted in the main housing 2, the connection pipe main body 601 is located at a higher position than the development reception port 53111.

As shown in FIGS. 7 and 10, the connection pipe main body 601 has a connection pipe reception port 6011 (see FIG. 7) and a connection pipe discharge port 6012 (see FIG. 10). In other words, the connection pipe 60Y has the connection pipe reception port 6011 and the connection pipe discharge port 6012.

As shown in FIG. 7, the connection pipe reception port 6011 is located at one end of the connection pipe 60Y in the first direction. The connection pipe reception port 6011 communicates with the internal space of the connection pipe main body 601. In a state where the drum cartridge 5Y is mounted in the main housing 2 and the toner container 6Y is attached to the drum cartridge 5Y, the connection pipe reception port 6011 receives toner discharged from the toner discharge port 7132 (see FIG. 14).

As shown in FIG. 10, the connection pipe discharge port 6012 is located at the other end of the connection pipe 60Y in the first direction. The connection pipe discharge port 6012 communicates with the internal space of the connection pipe main body 601. The connection pipe discharge port 6012 communicates with the development reception port 53111. The connection pipe discharge port 6012 discharges the toner in the connection pipe 60Y to the development reception port 53111.

2.8.2 Insertion Portion 602

As shown in FIG. 7, the insertion portion 602 is aligned with the connection pipe main body 601 in a radial direction of the connection pipe main body 601. The insertion portion 602 extends in the first direction. The insertion portion 602 has a cylindrical shape. The insertion portion 602 is connected to the circumferential surface of the connection pipe main body 601. The internal space of the insertion portion 602 communicates with the connection pipe reception port 6011. As shown in FIG. 2, in a state where the drum cartridge 5Y is mounted in the main housing 2 and the toner container 6Y is attached to the drum cartridge 5Y, the toner discharge portion 713 (see FIG. 11) of the toner container 6Y is inserted in the insertion portion 602. In a state where the toner discharge portion 713 is inserted in the insertion portion 602, the connection pipe reception port 6011 (see FIG. 7) communicates with the toner discharge port 7132 (see FIG. 14) of the toner discharge portion 713.

2.9 Connection Pipe Shutter 61Y

As shown in FIGS. 6 and 7, the connection pipe shutter 61Y is located inside the insertion portion 602. The connection pipe shutter 61Y opens and closes the connection pipe reception port 6011 (see FIG. 7). Specifically, the connection pipe shutter 61Y is movable relative to the insertion portion 602 of the connection pipe 60Y between a closed position (see FIG. 6) and an open position (see FIG. 2). The connection pipe shutter 61Y (see FIG. 2) located at the open position is located closer to the side plate 541A than the connection pipe shutter 61Y (see FIG. 6) located at the closed position is in the first direction. The connection pipe shutter 61Y is movable in the first direction between the closed position and the open position. As shown in FIG. 6, the connection pipe shutter 61Y closes the connection pipe reception port 6011 in a state where the connection pipe shutter 61Y is located at the closed position. As shown in FIG. 2, the connection pipe reception port 6011 is opened in a state where the connection pipe shutter 61Y is located at the open position. The connection pipe shutter 61Y located at the open position is pressed toward the closed position by a spring 611.

2.10 Second Seal Member 62Y

As shown in FIG. 10, the second seal member 62Y is located between the development reception portion 5311 and the other end of the connection pipe main body 601 in the first direction. The second seal member 62Y is located around the connection pipe discharge port 6012 and the development reception port 53111. The second seal member 62Y seals between the connection pipe 60Y and the development housing 531Y. Specifically, the second seal member 62Y seals between the development reception portion 5311 and the other end of the connection pipe 60Y in the first direction.

As shown in FIG. 6, the second seal member 62Y is located between the side plate 541A and one end of the development housing 531Y in the first direction.

2.11 Connection Pipe Conveyor 63Y

As shown in FIGS. 7 and 10, the connection pipe conveyor 63Y is located inside the connection pipe main body 601. The connection pipe conveyor 63Y conveys the toner in the connection pipe main body 601 in the first direction toward the connection pipe discharge port 6012. In this embodiment, the connection pipe conveyor 63Y is an auger screw.

3. DETAILS OF TONER CONTAINER 6Y

Next, details of the toner container 6Y will be described with reference to FIGS. 11 to 15.

In the following description of the toner container 6Y, the terms "first direction" and "vertical direction" are the first direction and the vertical direction in a state where the drum cartridge 5Y is mounted in the main housing 2 and the toner container 6Y is attached to the drum cartridge 5Y.

Figure 11:
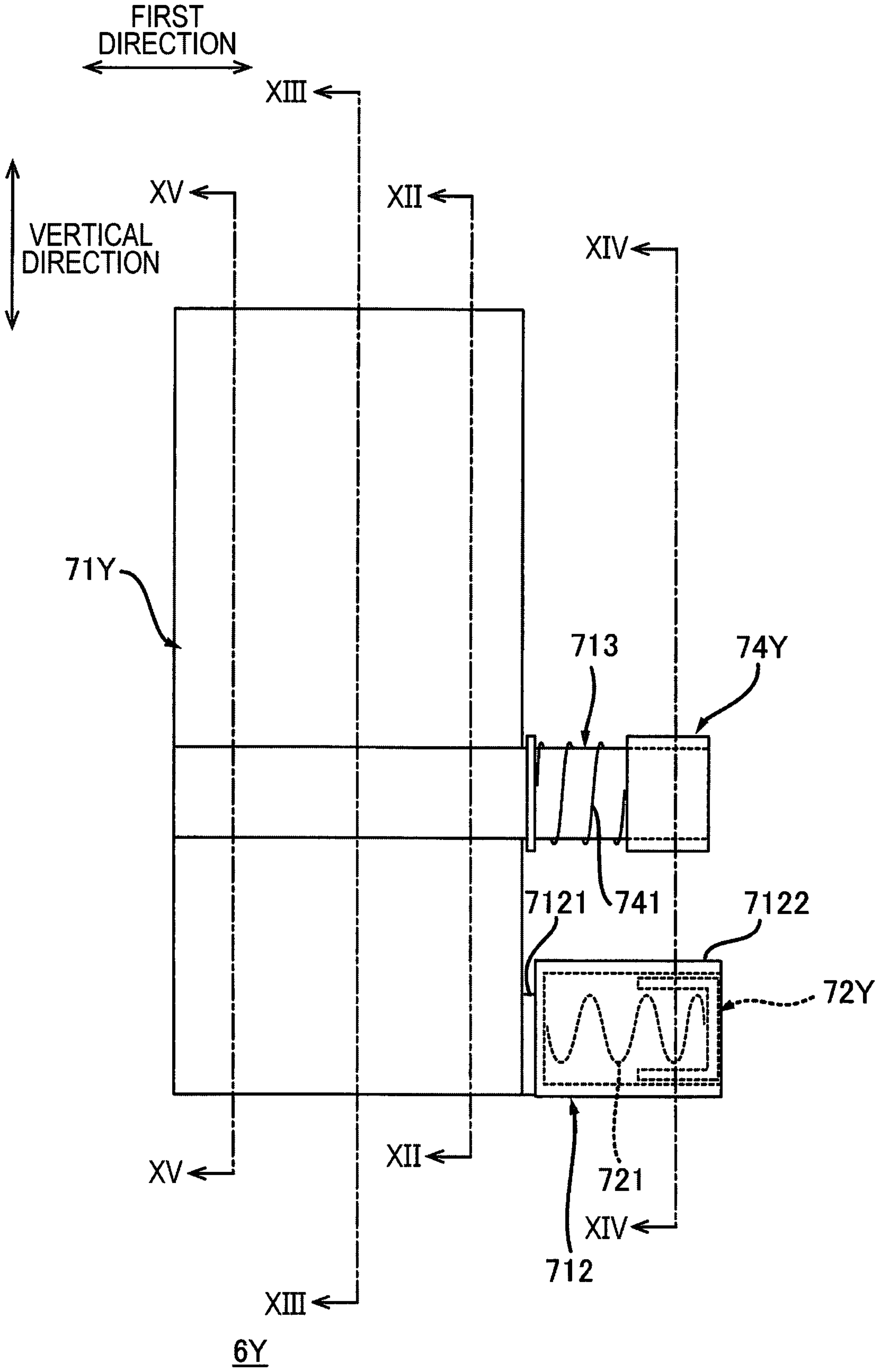
FIG. 11 is an enlarged view of a toner container shown in FIG. 2.

As shown in FIG. 11, the toner container 6Y includes a toner housing 71Y, a first toner shutter 72Y, a first toner conveyor 73Y (see FIG. 12), a second toner shutter 74Y, a second toner conveyor 75Y (see FIG. 12), and a third toner conveyor 76Y (see FIG. 12) as a toner conveyor.

3.1 Toner Housing 71Y

Figure 12:
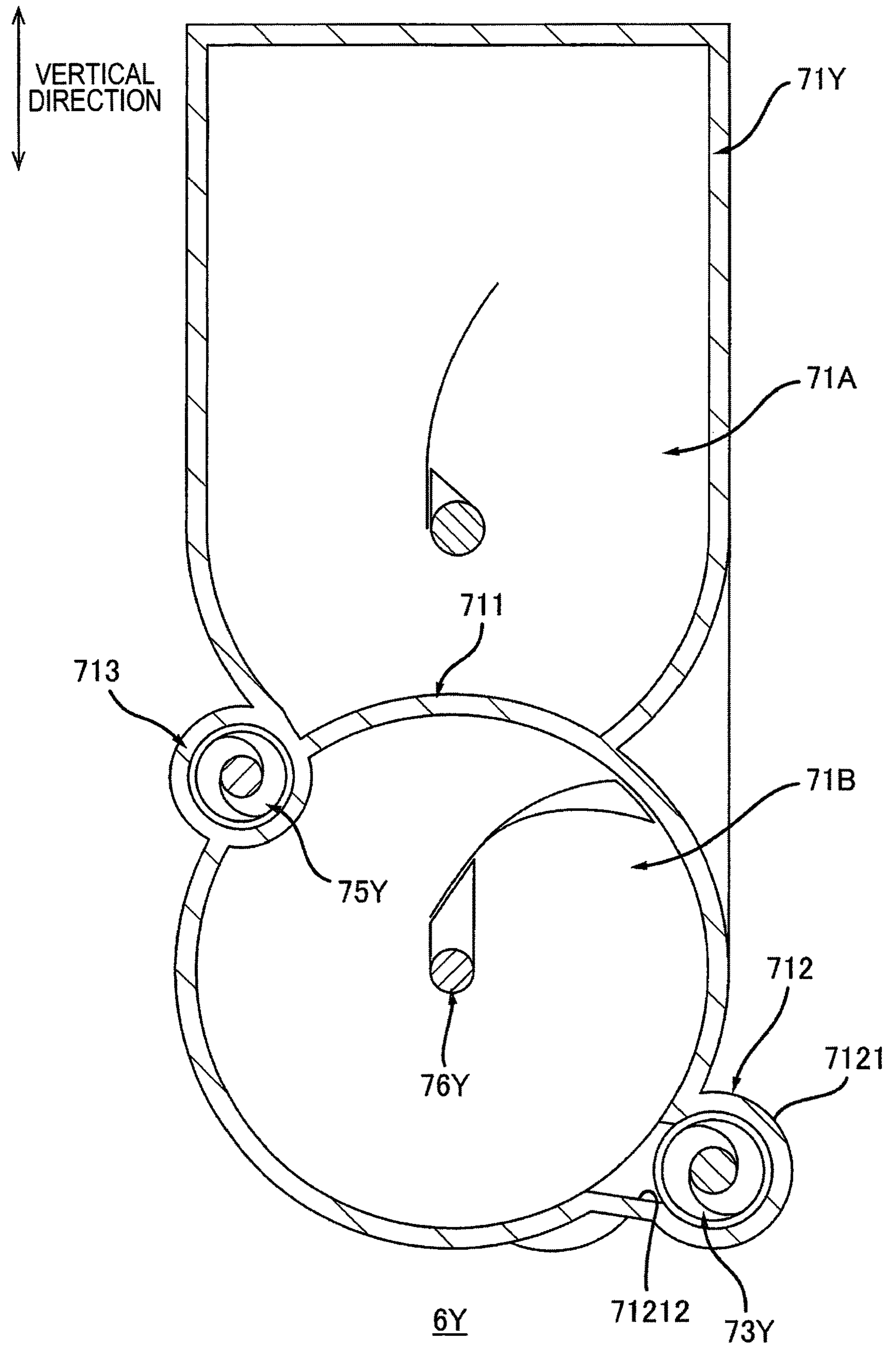
FIG. 12 is a cross-sectional view of the toner container shown in FIG. 11, taken along a line XII-XII.

As shown in FIG. 11, the toner housing 71Y extends in the first direction and the vertical direction. As shown in FIG. 12, the toner housing 71Y has a partition wall 711, a toner reception portion 712, and a toner discharge portion 713.

3.1.1 Partition Wall 711

Figure 13:
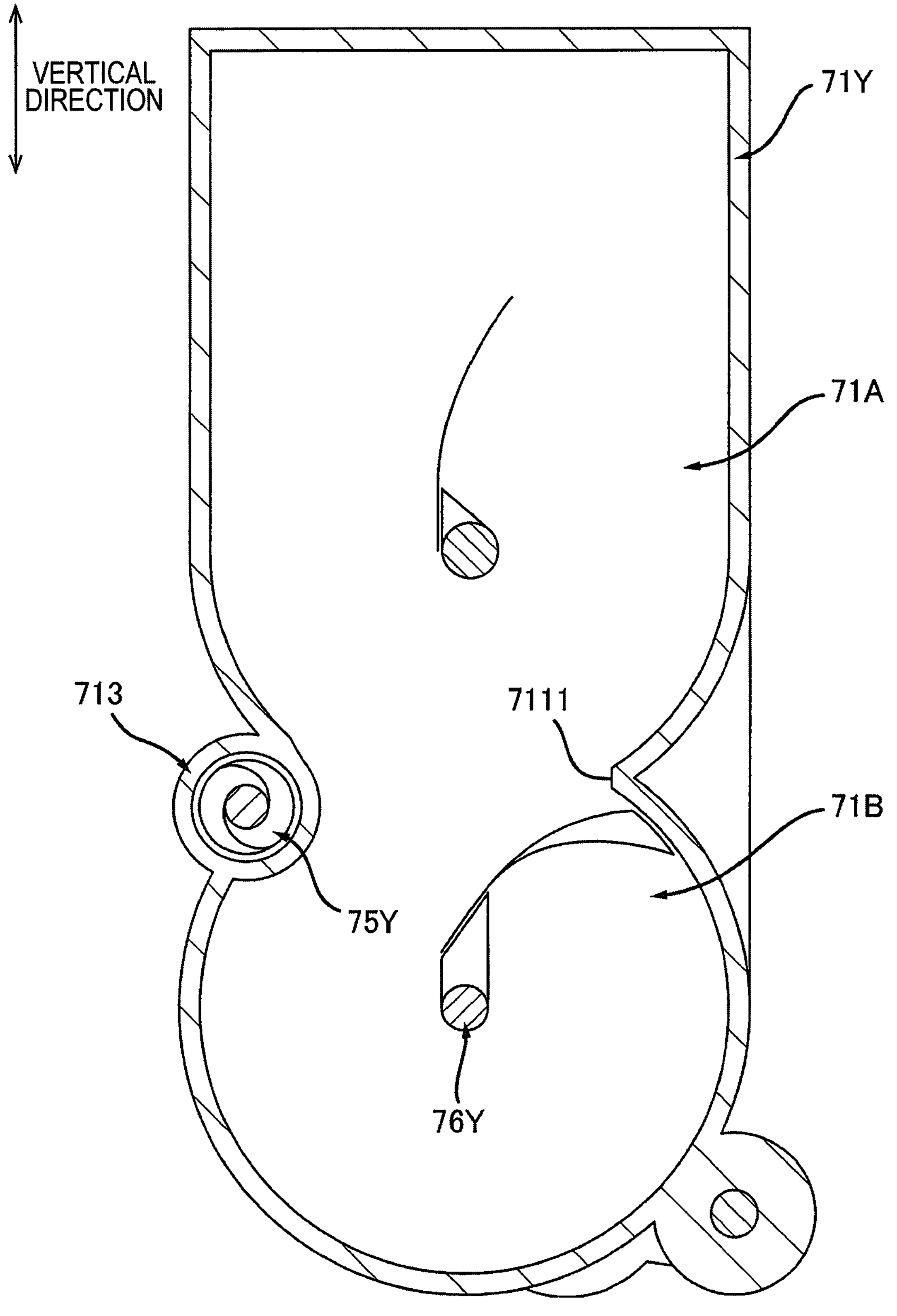
FIG. 13 is a cross-sectional view of the toner container shown in FIG. 11, taken along a line XIII-XIII.

The partition wall 711 divides the internal space of the toner housing 71Y into a first internal space 71A and a second internal space 71B. The first internal space 71A is located above the second internal space 71B. As shown in FIG. 13, the partition wall 711 has a passage 7111. The passage 7111 allows communication between the first internal space 71A and the second internal space 71B. The passage 7111 is located in the center of the partition wall 711 in the first direction. The toner in the first internal space 71A passes through the passage 7111 and enters the second internal space 71B.

3.1.2 Toner Reception Portion 712

As shown in FIG. 11, the toner reception portion 712 is located at the lower end of the toner housing 71Y. As shown in FIG. 2, in a state where the drum cartridge 5Y is mounted in the main housing 2 and the toner container 6Y is attached to the drum cartridge 5Y, the toner reception portion 712 receives toner discharged from the toner pipe 56Y (see FIG. 6). As shown in FIG. 14, the toner reception portion 712 has a toner reception portion main body 7121 and an insertion portion 7122.

The toner reception portion main body 7121 extends in the first direction. The toner reception portion main body 7121 has a cylindrical shape. As shown in FIGS. 12 and 14, the toner reception portion main body 7121 has a toner reception port 71211 (see FIG. 14) and a passage 71212 (see FIG. 12). In other words, the toner container 6Y has the toner reception port 71211.

As shown in FIG. 14, the toner reception port 71211 is located at the other end of the toner reception portion main body 7121 in the first direction. The toner reception port 71211 communicates with the internal space of the toner reception portion main body 7121. In a state where the drum cartridge 5Y is mounted in the main housing 2 and the toner container 6Y is attached to the drum cartridge 5Y, the toner reception port 71211 receives toner discharged from the discharge port 562 (see FIG. 7) of the toner pipe 56Y.

As shown in FIG. 12, the passage 71212 is located at one end of the toner reception portion main body 7121 in the first direction. The passage 71212 allows communication between the internal space of the toner reception portion main body 7121 and the second internal space 71B of the toner housing 71Y. The toner in the toner reception portion main body 7121 passes through the passage 71212 and enters the second internal space 71B of the toner housing 71Y.

As shown in FIG. 14, the insertion portion 7122 is aligned with the toner reception portion main body 7121 in a radial direction of the toner reception portion main body 7121. The insertion portion 7122 extends in the first direction. The insertion portion 7122 has a cylindrical shape. The insertion portion 7122 is connected to the circumferential surface of the toner reception portion main body 7121. The internal space of the insertion portion 7122 communicates with the toner reception port 71211. As shown in FIG. 2, in a state where the drum cartridge 5Y is mounted in the main housing 2 and the toner container 6Y is attached to the drum cartridge 5Y, the toner pipe 56Y (see FIG. 6) of the drum cartridge 5Y is inserted in the insertion portion 7122 (see FIG. 11). In a state where the toner pipe 56Y is inserted in the insertion portion 7122, the toner reception port 71211 (see FIG. 14) communicates with the discharge port 562 (see FIG. 7) of the toner pipe 56Y.

3.1.3 Toner Discharge Portion 713

Figure 15:
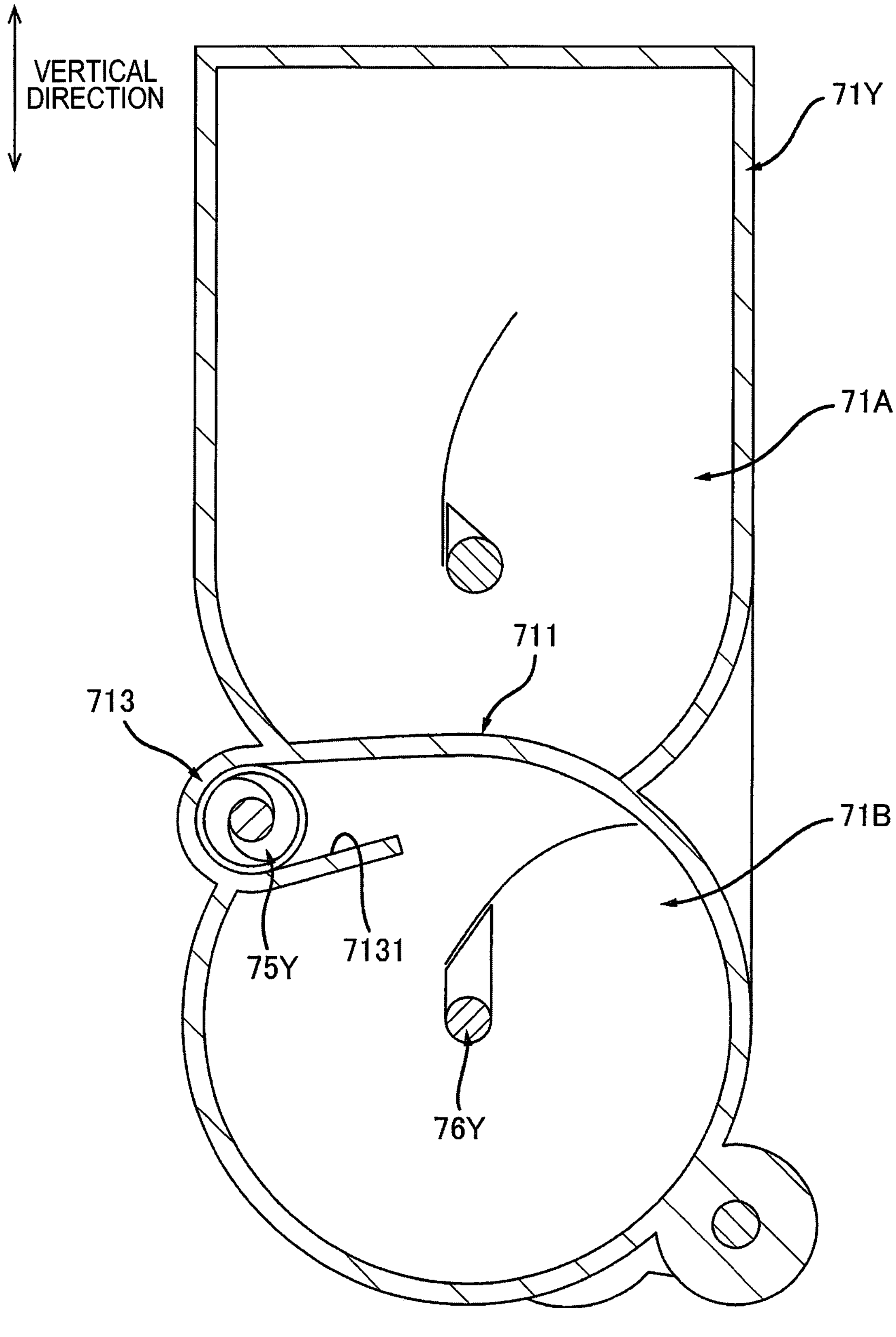
FIG. 15 is a cross-sectional view of the toner container shown in FIG. 11, taken along a line XV-XV.

As shown in FIG. 11, the toner discharge portion 713 is located in the center of the toner housing 71Y in the vertical direction. The toner discharge portion 713 discharges the toner inside the toner housing 71Y. The toner discharge portion 713 extends in the first direction. As shown in FIGS. 14 and 15, the toner discharge portion 713 has a passage 7131 (see FIG. 15) and a toner discharge port 7132 (see FIG. 14). In other words, the toner container 6Y has the toner discharge port 7132.

As shown in FIG. 15, the passage 7131 is located at one end of the toner discharge portion 713 in the first direction. The passage 7131 allows communication between the internal space of the toner discharge portion 713 and the second internal space 71B of the toner housing 71Y. The toner in the second internal space 71B passes through the passage 7131 and enters the toner discharge portion 713.

As shown in FIG. 14, the toner discharge port 7132 is located at the other end of the toner discharge portion 713 in the first direction. The toner discharge port 7132 communicates with the internal space of the toner discharge portion 713. The toner discharge port 7132 discharges the toner in the toner discharge portion 713. Specifically, the toner discharge port 7132 discharges the toner that has entered the toner discharge portion 713 from the second internal space 71B of the toner housing 71Y. Thus, the toner discharge port 7132 discharges the toner in the toner container 6Y.

3.2 First Toner Shutter 72Y

As shown in FIGS. 11 and 14, the first toner shutter 72Y is located inside the insertion portion 7122. The first toner shutter 72Y opens and closes the toner reception port 71211. Specifically, the first toner shutter 72Y is movable relative to the insertion portion 7122 between a closed position (see FIG. 11) and an open position (see FIG. 2). The first toner shutter 72Y (see FIG. 2) located at the open position is located closer to the toner housing 71Y in the first direction than the first toner shutter 72Y (see FIG. 11) located at the closed position is. The first toner shutter 72Y is movable in the first direction between the closed position and the open position. As shown in FIG. 11, the first toner shutter 72Y closes the toner reception port 71211 (see FIG. 14) in a state where the first toner shutter 72Y is at the closed position. As shown in FIG. 2, the toner reception port 71211 is opened in a state where the first toner shutter 72Y is at the open position. The first toner shutter 72Y located at the open position is pressed toward the closed position by a spring 721.

3.3 First Toner Conveyor 73Y

As shown in FIGS. 12 and 14, the first toner conveyor 73Y is located inside the toner reception portion main body 7121. The first toner conveyor 73Y conveys the toner in the toner reception portion main body 7121 toward the passage 71212 (see FIG. 12) in the first direction. In this embodiment, the first toner conveyor 73Y is an auger screw.

3.4 Second Toner Shutter 74Y

As shown in FIGS. 11 and 14, the second toner shutter 74Y is located at the other end of the toner discharge portion 713 in the first direction. The second toner shutter 74Y is located on the circumferential surface of the toner discharge portion 713. The second toner shutter 74Y opens and closes the toner discharge port 7132 (see FIG. 14). Specifically, the second toner shutter 74Y is movable relative to the toner discharge portion 713 between a closed position (see FIG. 11) and an open position (see FIG. 2). The second toner shutter 74Y (see FIG. 2) located at the open position is located closer to the toner housing 71Y in the first direction than the second toner shutter 74Y (see FIG. 11) located at the closed position is. The second toner shutter 74Y is movable in the first direction between the closed position and the open position. As shown in FIG. 11, the second toner shutter 74Y closes the toner discharge port 7132 (see FIG. 14) in a state where the second toner shutter 74Y is located at the closed position. As shown in FIG. 2, the toner discharge port 7132 is opened in a state where the second toner shutter 74Y is located at the open position. The second toner shutter 74Y located at the open position is pressed toward the closed position by a spring 741.

3.5 Second Toner Conveyor 75Y

As shown in FIGS. 14 and 15, the second toner conveyor 75Y is located inside the toner discharge portion 713. The second toner conveyor 75Y conveys the toner in the toner discharge portion 713 toward the toner discharge port 7132 in the first direction. In this embodiment, the second toner conveyor 75Y is an auger screw.

3.6 Third Toner Conveyor 76Y

As shown in FIGS. 12, 13 and 15, the third toner conveyor 76Y is located inside the second internal space 71B of the toner housing 71Y. The third toner conveyor 76Y conveys the toner in the second internal space 71B in the first direction while agitating the same. Thereby, the recovered toner and the returned toner are mixed with unused toner from the first internal space 71A inside the second internal space 71B. Specifically, the third toner conveyor 76Y conveys the toner in the second internal space 71B from the passage 71212 (see FIG. 12) toward the passage 7131 (see FIG. 15). In other words, the third toner conveyor 76Y conveys the toner from the toner reception portion 712 toward the toner discharge portion 713. That is, the third toner conveyor 76Y conveys the toner from the toner reception port 71211 toward the toner discharge port 7132.

4. OPERATIONS AND EFFECTS (1) According to the image forming apparatus 1, as shown in FIG. 10, the toner pipe 56Y receives the recovered toner from the drum cleaner 55Y. And, as shown in FIG. 2, in a state where the drum cartridge 5Y is mounted in the main housing 2 and the toner container 6Y is attached to the drum cartridge 5Y, the recovered toner that has entered the toner pipe 56Y is conveyed to the toner container 6Y through the toner pipe 56Y.

In other words, the recovered toner is returned to the toner container 6Y through the toner pipe 56Y.

Thus, the recovered toner is mixed with the unused toner in the toner container 6Y and supplied to the photosensitive drum 51Y again.

Thus, it is not necessary to provide a portion for containing the recovered toner at the toner container 6Y, and the capacity of the toner container 6Y is increased accordingly.

As a result, the capacity of the toner container 6Y is increased while suppressing an increase in the size of the toner container 6Y.

Further, as shown in FIG. 10, the toner pipe 56Y receives the returned toner from the development discharge portion 5312 of the development housing 531Y.

Thus, the toner in the development housing 531Y is also returned to the toner container 6Y through the toner pipe 56Y.

Thus, the toner is circulated between the development unit 53Y and the toner container 6Y to suppress the toner remaining in the development unit 53Y.

This suppresses the toner remaining in the development unit 53Y being repeatedly charged and deteriorated in the development unit 53Y.

Further, by returning the recovered toner and the returned toner from the development housing 531Y to the toner container 6Y through the toner pipe 56Y, the recovered toner and the returned toner are mixed in the toner pipe 56Y.

(2) According to the image forming apparatus 1, as shown in FIG. 10, the toner pipe 56Y is located at a lower position than the development reception port 53111.

Thus, the toner in the development housing 531Y is conveyed to the toner pipe 56Y using gravity.

As a result, the toner in the development unit 53Y is discharged smoothly.

(3) According to the image forming apparatus 1, as shown in FIGS. 9 and 10, the development unit 53Y includes the second development conveyor 536Y.

Thus, the toner in the development housing 531Y is smoothly discharged by the second development conveyor 536Y.

(4) According to the image forming apparatus 1, as shown in FIG. 11, the toner container 6Y has the first toner shutter 72Y and the second toner shutter 74Y.

Thus, by closing the first toner shutter 72Y and the second toner shutter 74Y, spilling of the toner in the toner container 6Y from the toner reception port 71211 and the toner discharge port 7132 is suppressed in a state where the toner container 6Y is detached from the drum cartridge 5Y.

(5) According to the image forming apparatus 1, as shown in FIG. 6, the drum cartridge 5Y has the toner pipe shutter 57Y.

Thus, by closing the toner pipe shutter 57Y, spilling of the toner in the development unit 53Y from the discharge port 562 of the toner pipe 56Y is suppressed in a state where the toner container 6Y is detached from the drum cartridge 5Y.

(6) According to the image forming apparatus 1, as shown in FIG. 10, the drum cartridge 5Y has the first seal member 58Y. The first seal member 58Y is located around the development discharge port 53121.

Thus, the first seal member 58Y suppresses leakage of toner from the development discharge port 53121 when the development unit 53Y moves relative to the photosensitive drum 51Y.

(7) According to the image forming apparatus 1, as shown in FIG. 10, the drum cartridge 5Y has the second seal member 62Y. The second seal member 62Y is located around the connection pipe discharge port 6012 and the development reception port 53111.

Thus, the second seal member 62Y suppresses leakage of toner from the connection pipe discharge port 6012 and the development reception port 53111 when the development unit 53Y moves relative to the photosensitive drum 51Y.

(8) According to the image forming apparatus 1, the drum cartridge 5Y includes the connection pipe shutter 61Y.

Thus, by closing the connection pipe shutter 61Y, spilling of the toner in the development unit 53Y from the connection pipe reception port 6011 of the connection pipe 60Y is suppressed in a state where the toner container 6Y is detached from the drum cartridge 5Y.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents.

Some specific examples of potential alternatives, modifications, or variations in the described invention may be provided as appropriate.

What is claimed is:

1. An image forming apparatus comprising:

a photosensitive drum rotatable about a first axis extending in a first direction;

a toner container configured to contain toner;

a development housing configured to contain toner from the toner container;

a development roller rotatably supported by the development housing, the development roller being configured to supply toner in the development housing to the photosensitive drum;

a drum cleaner configured to clean a circumferential surface of the photosensitive drum; and a toner pipe configured to allow passage of toner that is recovered from the drum cleaner to the toner container, the toner pipe having a discharge port configured to discharge toner in the toner pipe, the toner container including:

a toner discharge port configured to discharge toner in the toner container;

a toner reception port configured to receive toner discharged from the discharge port of the toner pipe; and a toner conveyor configured to convey toner from the toner reception port toward the toner discharge port, the development housing including:

a development reception port configured to receive toner discharged from the toner discharge port; and a development discharge port configured to discharge, to the toner pipe, toner that is retuned from the development housing to the toner container.

2. The image forming apparatus according to claim 1, wherein the photosensitive drum, the development housing, the development roller, the drum cleaner, and the toner pipe constitute a drum cartridge;

wherein the toner container is attachable to and detachable from the drum cartridge;

wherein, in a state where the toner container is attached to the drum cartridge, the toner reception port is configured to receive toner discharged from the discharge port of the toner pipe; and wherein, in a state where the toner container is attached to the drum cartridge, the development reception port is configured to receive toner discharged from the toner discharge port.

3. The image forming apparatus according to claim 1, wherein the toner container is aligned with the development housing in the first direction.

4. The image forming apparatus according to claim 1, wherein the toner pipe is located at a lower position than the development reception port.

5. The image forming apparatus according to claim 1, wherein the development housing accommodates a development conveyor configured to convey toner in the development housing toward the development discharge port.

6. The image forming apparatus according to claim 1, wherein the toner container includes:

a first toner shutter configured to open and close the toner reception port; and a second toner shutter configured to open and close the toner discharge port.

7. The image forming apparatus according to claim 1, further comprising:

a toner pipe shutter configured to open and close the discharge port of the toner pipe.

8. The image forming apparatus according to claim 1, wherein the development housing is movable relative to the photosensitive drum; and wherein the image forming apparatus further comprises:

a first seal member located around the development discharge port and configured to seal between the toner pipe and the development housing.

9. The image forming apparatus according to claim 8, further comprising:

a side plate supporting one end of the photosensitive drum in the first direction, the side plate being spaced, in the first direction, from one end of the development housing in the first direction, wherein the first seal member is located between the side plate and the one end of the development housing in the first direction.

10. The image forming apparatus according to claim 9, further comprising:

a connection pipe supported by the side plate and connecting the toner container with the development housing, the connection pipe having a connection pipe reception port and a connection pipe discharge port, the connection pipe reception port being configured to receive toner discharged from the toner discharge port, the connection pipe discharge port being configured to discharge toner in the connection pipe to the development reception port; and a second seal member located around the connection pipe discharge port and the development reception port, the second seal member being configured to seal between the connection pipe and the development housing.

11. The image forming apparatus according to claim 10, further comprising:

a connection pipe shutter configured to open and close the connection pipe reception port.

12. An image forming apparatus comprising:

a first photosensitive drum rotatable about a first axis extending in a first direction;

a second photosensitive drum rotatable about a second axis extending in the first direction, the second photosensitive drum being aligned with the first photosensitive drum in a second direction crossing the first direction;

a first toner container configured to contain toner;

a first development housing configured to contain toner from the first toner container;

a first development roller rotatably supported by the first development housing, the first development roller being configured to supply toner in the first development housing to the first photosensitive drum;

a second toner container configured to contain toner, the second toner container being aligned with the first toner container in the second direction;

a second development housing configured to contain toner from the second toner container, the second development housing being aligned with the first development housing in the second direction;

a second development roller rotatably supported by the second development housing, the second development roller being configured to supply toner in the second development housing to the second photosensitive drum;

a drum cleaner configured to clean a circumferential surface of the first photosensitive drum; and a toner pipe configured to allow passage of toner that is recovered from the drum cleaner to the first toner container, the toner pipe having a discharge port configured to discharge toner in the toner pipe, the first toner container including:

a toner discharge port configured to discharge toner in the first toner container;

a toner reception port configured to receive toner discharged from the discharge port of the toner pipe; and a toner conveyor configured to convey toner from the toner reception port toward the toner discharge port, the first development housing including:

a development reception port configured to receive toner discharged from the toner discharge port; and a development discharge port configured to discharge, to the toner pipe, toner that is retuned from the first development housing to the first toner container.

13. The image forming apparatus according to claim 12, wherein the first toner container is aligned with the first development housing in the first direction.

14. The image forming apparatus according to claim 12, wherein the toner pipe is located at a lower position than the development reception port.

15. The image forming apparatus according to claim 12, wherein the first development housing accommodates a development conveyor configured to convey toner in the first development housing toward the development discharge port.

16. The image forming apparatus according to claim 12, wherein the first toner container includes:

a first toner shutter configured to open and close the toner reception port; and a second toner shutter configured to open and close the toner discharge port.

17. The image forming apparatus according to claim 12, further comprising:

a toner pipe shutter configured to open and close the discharge port of the toner pipe.

18. The image forming apparatus according to claim 12, wherein the first development housing is movable relative to the first photosensitive drum; and wherein the image forming apparatus further comprises:

a first seal member located around the development discharge port and configured to seal between the toner pipe and the first development housing.

19. The image forming apparatus according to claim 18, further comprising:

a side plate supporting one end of the first photosensitive drum in the first direction, the side plate being spaced, in the first direction, from one end of the first development housing in the first direction, wherein the first seal member is located between the side plate and the one end of the first development housing in the first direction.

20. The image forming apparatus according to claim 19, further comprising:

a connection pipe supported by the side plate and connecting the first toner container with the first development housing, the connection pipe having a connection pipe reception port and a connection pipe discharge port, the connection pipe reception port being configured to receive toner discharged from the toner discharge port, the connection pipe discharge port being configured to discharge toner in the connection pipe to the development reception port;

a second seal member located around the connection pipe discharge port and the development reception port, the second seal member being configured to seal between the connection pipe and the first development housing; and a connection pipe shutter configured to open and close the connection pipe reception port.

* * * * *